(12) United States Patent
Tang et al.

(10) Patent No.: US 11,956,675 B2
(45) Date of Patent: Apr. 9, 2024

(54) COMMUNICATION APPARATUS, CONTROL APPARATUS, AND COMMUNICATION SYSTEM

(71) Applicant: Sony Corporation, Tokyo (JP)

(72) Inventors: Yifu Tang, Tokyo (JP); Naoki Kusashima, Tokyo (JP); Hiromasa Uchiyama, Tokyo (JP); Hiroki Matsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 495 days.

(21) Appl. No.: 17/270,058

(22) PCT Filed: Sep. 10, 2019

(86) PCT No.: PCT/JP2019/035451
§ 371 (c)(1),
(2) Date: Feb. 22, 2021

(87) PCT Pub. No.: WO2020/066583
PCT Pub. Date: Apr. 2, 2020

(65) Prior Publication Data
US 2021/0329498 A1  Oct. 21, 2021

(30) Foreign Application Priority Data

Sep. 27, 2018  (JP) ................................ 2018-182200

(51) Int. Cl.
*H04W 28/18* (2009.01)
*H04W 4/40* (2018.01)
(Continued)

(52) U.S. Cl.
CPC ............. *H04W 28/18* (2013.01); *H04W 4/40* (2018.02); *H04W 72/0446* (2013.01); *H04W 72/54* (2023.01)

(58) Field of Classification Search
CPC ....... H04W 28/18; H04W 4/40; H04W 72/54; H04W 72/0446
(Continued)

(56) References Cited

U.S. PATENT DOCUMENTS

2018/0042023 A1\* 2/2018 Sheng ..................... H04W 4/40
2019/0104510 A1\* 4/2019 Lee ....................... H04W 72/12
(Continued)

FOREIGN PATENT DOCUMENTS

CN   106576349 A   4/2017
CN   107736064 A   2/2018
(Continued)

OTHER PUBLICATIONS

International Search Report and Written Opinion dated Dec. 3, 2019, received for PCT Application PCT/JP2019/035451, Filed on Sep. 10, 2019, 9 pages including English Translation.
(Continued)

*Primary Examiner* — Obaidul Huq
(74) *Attorney, Agent, or Firm* — XSENSUS LLP

(57) ABSTRACT

There is provided a communication apparatus including: a communication unit that performs radio communication; a control unit that controls an operation of sensing resources to be used in a communication scheme used for performing inter-device communication with other devices, in which the control unit controls to sense the resource in a predetermined minimum unit on a time axis.

15 Claims, 31 Drawing Sheets

(51) Int. Cl.
*H04W 72/0446* (2023.01)
*H04W 72/54* (2023.01)

(58) Field of Classification Search
USPC .......................................... 370/310, 328, 329
See application file for complete search history.

(56) References Cited

U.S. PATENT DOCUMENTS

| | | |
|---|---|---|
| 2019/0132832 A1 | 5/2019 | Uchiyama et al. |
| 2019/0305923 A1* | 10/2019 | Luo .......................... H04L 5/16 |
| 2020/0305152 A1 | 9/2020 | Yasukawa et al. |

FOREIGN PATENT DOCUMENTS

| | | | |
|---|---|---|---|
| CN | 108028730 A | 5/2018 | |
| CN | 110169159 A | 8/2019 | |
| EP | 3445107 A1 | 2/2019 | |
| JP | 2017-208796 A | 11/2017 | |
| TW | 201703575 A | 1/2017 | |
| WO | WO-2015020448 A1 * | 2/2015 | ............ H04W 48/08 |
| WO | 2017/170775 A1 | 10/2017 | |
| WO | 2017/179286 A1 | 10/2017 | |
| WO | 2017/195538 A1 | 11/2017 | |
| WO | 2018/027528 A1 | 2/2018 | |
| WO | WO-2018030938 A1 * | 2/2018 | ............... H04B 7/26 |

OTHER PUBLICATIONS

LG Electronics, "Discussion on LTE and NR Uu Enhancements to control NR Sidelink", 3GPP TSG RAN WG1 Meeting #94, R1-1808525, Aug. 20-24, 2018, 5 pages.

Lenovo et al., "Discussion on Resource Pool Design for 3GPP V2X Phase 2", 3GPP TSG RAN WG1 Meeting #88bis, R1-1705656, Apr. 3-7, 2017, 4 pages.

Intel Corporation, "Enhancements of NR and LTE Uu Link to Control NR Sidelink", 3GPP TSG RAN WG1 Meeting #94, R1-1808699, Aug. 20-24, 2018, 9 pages.

Intel Corporation, "Sidelink Resource Allocation Mechanisms for NR V2X Communication", 3GPP TSG RAN WG1 Meeting #94, R1-1808696, Aug. 20-24, 2018, total 13 pages, Gothenburg, Sweden.

* cited by examiner

FIG.25C
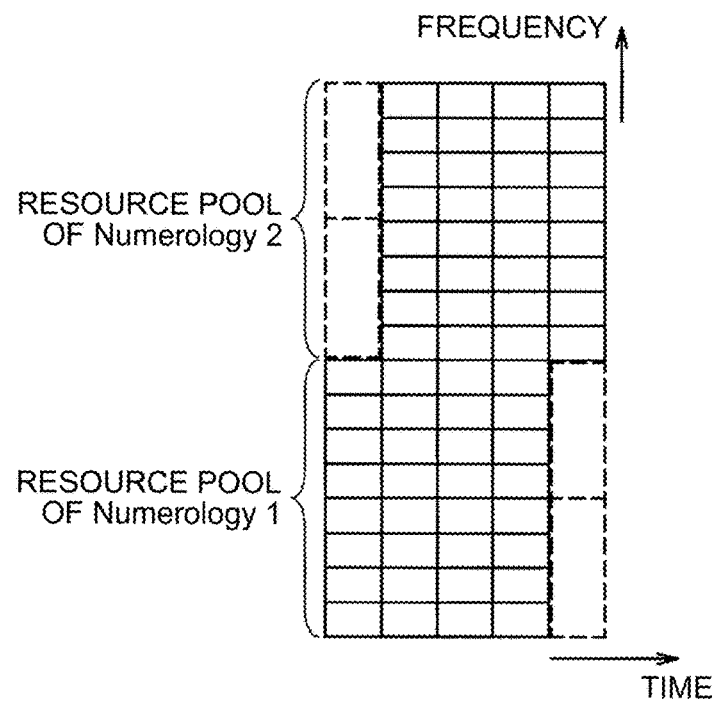
FIG.26
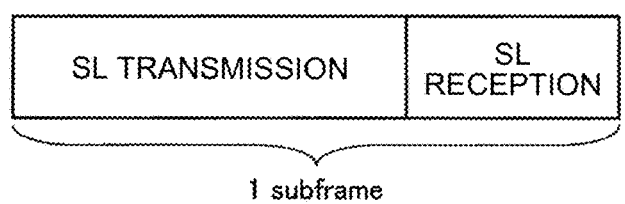
FIG.27
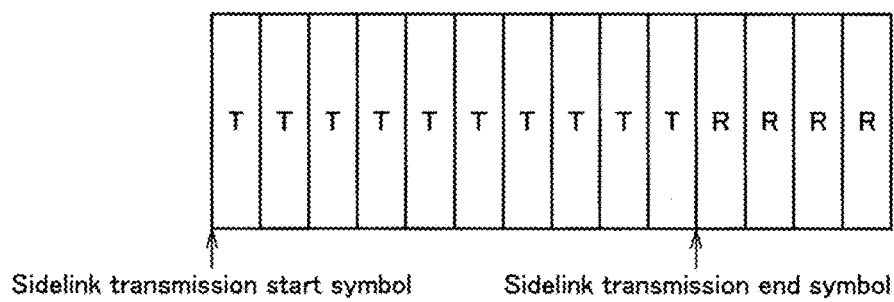
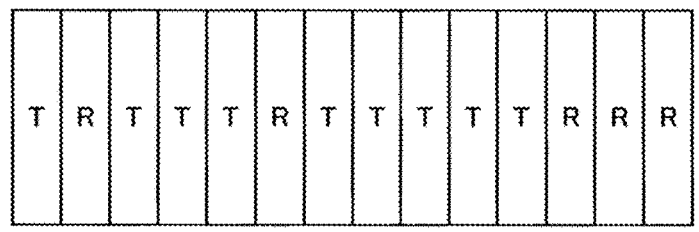

COMMUNICATION APPARATUS, CONTROL APPARATUS, AND COMMUNICATION SYSTEM

CROSS REFERENCES TO RELATED APPLICATIONS

The present application is based on PCT filing PCT/JP2019/035451, filed Sep. 10, 2019, which claims priority to JP 2018-182200, filed Sep. 27, 2018, the entire contents of each are incorporated herein by reference.

FIELD

The present disclosure relates to a communication apparatus, a control apparatus, and a communication system.

BACKGROUND

In order to realize future autonomous driving, expectations for in-vehicle communication (V2X communication) are increasing in recent years. V2X communication is an abbreviation for Vehicle-to-X communication, which is a system of communication between a vehicle and "something". Examples of "something" here include vehicles, infrastructure, networks, and pedestrians (also referred to as V2V, V2I, V2N, and V2P, respectively). For example, Patent Literature 1 discloses an example of a technique related to V2X communication.

Regarding radio communication for vehicles, the development of 802.11p-based Dedicated Short Range Communication (DSRC) has been mainly promoted. In recent years, however, standardization of LTE-based in-vehicle communication, namely, "LTE-based V2X" has been promoted. The LTE-based V2X communication has supported the exchange of basic safety messages or the like.

CITATION LIST

Patent Literature

Patent Literature 1: JP 2017-208796 A

SUMMARY

Technical Problem

Meanwhile, a communication scheme using New Radio (NR), namely, NR V2X communication adopts a mechanism different from LTE-based V2X communication. This leads to a possibility of difficulty in performing resource sensing in the same method used in the LTE-based V2X communication.

In view of this situation, the present disclosure proposes a novel and improved communication apparatus, control apparatus, and communication system capable of efficiently sensing resources in NR V2X communication.

Solution to Problem

According to the present disclosure, a communication apparatus is provided that includes: a communication unit that performs radio communication; a control unit that controls an operation of sensing resources to be used in a communication scheme for inter-device communication with other devices, wherein the control unit controls to sense the resource in a predetermined minimum unit on a time axis.

Moreover, according to the present disclosure, a control apparatus is provided that includes: a communication unit that performs radio communication with a terminal device; a control unit that controls to notify of information to control an operation of sensing resources from the communication unit, the sensing resources being used in a communication scheme used for performing inter-device communication between the terminal device and another device, wherein the control unit controls to notify the terminal device of information needed for controlling to sense the resource in a predetermined minimum unit on a time axis, from the communication unit.

Moreover, according to the present disclosure, a communication system is provided that includes at least two sets of the communication apparatuses according to claim 1.

BRIEF DESCRIPTION OF DRAWINGS

FIG. 25C is an explanatory diagram illustrating an example of resource pool configuration when different numerologies coexist.

FIG. 26 is an explanatory diagram illustrating an example of an NR slot format of an NR sidelink.

FIG. 27 is an explanatory diagram illustrating sensing at a symbol level.

DESCRIPTION OF EMBODIMENTS

A preferred embodiment of the present disclosure will be described in detail hereinbelow with reference to the accompanying drawings. Note that redundant descriptions will be omitted from the present specification and the drawings by assigning the same reference signs to components having substantially the same functional configuration.

Note that the description will be provided in the following order.

Figure 1:
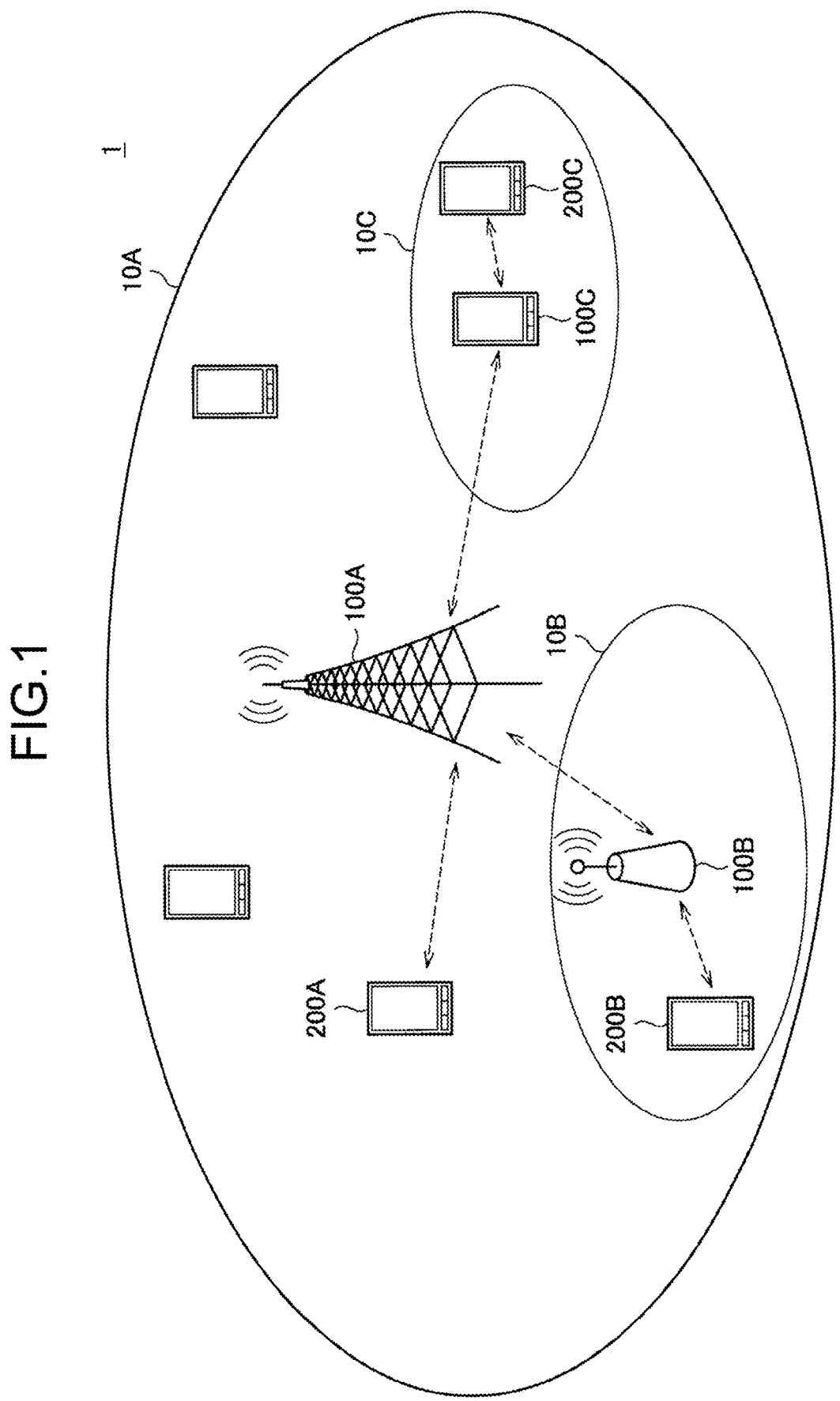
FIG. 1 is an explanatory diagram illustrating an example of a schematic configuration of a system according to an embodiment of the present disclosure.

1. Configuration examples
1.1. Example of system configuration
1.2. Configuration example of base station
1.3. Configuration example of terminal device
2. V2X communication
3. Method of allocating resources to sidelinks
4. NR frame structure
5. Resource grid
6. Slot format
7. Changing unit of sensing for each of Numerologies and frame structures
8. Coexistence of LTE V2X and NR V2X
9. Application example
9.1. Application examples related to base station
9.2. Application examples related to terminal devices
10. Summary 1. Configuration Examples 1.1. Example of System Configuration First, an example of a schematic configuration of a system 1 according to an embodiment of the present disclosure will be described with reference to FIG. 1. FIG. 1 is an explanatory diagram illustrating an example of a schematic configuration of the system 1 according to an embodiment of the present disclosure. As illustrated in FIG. 1, the system 1 includes a radio communication apparatus 100 and a terminal device 200. Here, the terminal device 200 is also referred to as a user. The user may also be referred to as a UE. A radio communication apparatus 100C is also referred to as a UE-Relay. The UE here may be the UE defined in LTE or LTE-A, and the UE-Relay may be the Prose UE to Network Relay discussed in 3GPP, or may more generally represent a communication device.

(1) Radio Communication Apparatus 100

The radio communication apparatus 100 is an apparatus that provides a radio communication service to devices under control of the apparatus. For example, the radio communication apparatus 100A is a base station of a cellular system (or mobile communication system). The base station 100A performs radio communication with a device (for example, a terminal device 200A) located inside a cell 10A of the base station 100A. For example, the base station 100A transmits a downlink signal to the terminal device 200A and receives an uplink signal from the terminal device 200A.

The base station 100A is logically connected to another base station via an X2 interface, for example, and can transmit and receive control information or the like. Furthermore, the base station 100A is logically connected to a core network (not illustrated) via an S1 interface, for example, and can transmit and receive control information or the like. Communication between these devices can be physically relayed by various devices.

Here, the radio communication apparatus 100A illustrated in FIG. 1 is a macro cell base station, and the cell 10A is a macro cell. By contrast, the radio communication apparatuses 100B and 100C are master devices that operate small cells 10B and 10C, respectively. As an example, the master device 100B is a fixedly installed small cell base station. The small cell base station 100B establishes a radio backhaul link with the macro cell base station 100A while establishing an access link with one or more terminal devices (for example, the terminal device 200B) within the small cell 10B. The radio communication apparatus 100B may be a relay node defined by 3GPP. The master device 100C is a dynamic access point (AP). The dynamic AP 100C is a mobile device that dynamically operates the small cell 10C. The dynamic AP 100C establishes a radio backhaul link with the macro cell base station 100A while establishing an access link with one or more terminal devices (for example, the terminal device 200C) within the small cell 10C. The dynamic AP 100C may be a terminal device equipped with hardware or software capable of operating as a base station or a wireless access point, for example. The small cell 10C in this case is a dynamically formed localized network/virtual cell.

The cell 10A can be operated in accordance with any type of radio communication schemes such as LTE, LTE-Advanced (LTE-A), LTE-ADVANCED PRO, GSM (registered trademark), UMTS, W-CDMA, CDMA2000, WiMAX, WiMAX2, or IEEE 802.16.

Note that the small cell is a concept that can include various types of cells smaller than a macro cell (for example, femtocell, nanocell, picocell, or microcell) that are arranged so as to overlap or not overlap the macrocell. In one example, the small cell is operated by a dedicated base station. In another example, the small cell is operated by a terminal as the master device temporarily operating as a small cell base station. A node referred to as a relay node can also be defined as an aspect of small cell base station. A radio communication apparatus that functions as a master station of a relay node is also referred to as a donor base station. A donor base station may represent DeNB in LTE, or more generally the master station of a relay node.

(2) Terminal Device 200

The terminal device 200 can perform communication in a cellular system (or mobile communication system). The terminal device 200 performs radio communication with a radio communication apparatus (for example, base station 100A, master device 100B or 100C) of the cellular system. For example, the terminal device 200A receives a downlink signal from the base station 100A and transmits an uplink signal to the base station 100A.

Furthermore, the terminal device 200 is not limited to a terminal referred to as an UE, and may be applied as a low cost terminal (Low cost UE) such as an MTC terminal, an Enhanced MTC (eMTC) terminal, and an NB-IoT terminal, for example. Furthermore, it is allowable to apply an infrastructure terminal such as a Road Side Unit (RSU) or a terminal such as Customer Premises Equipment (CPE).

(3) Supplementary Note

Although the schematic configuration of the system 1 has been illustrated above, the present technology is not limited to the example illustrated in FIG. 1. For example, the system 1 may have a configuration such as a configuration not including a master device, or Small Cell Enhancement (SCE), a Heterogeneous Network (HetNet), an MTC network, or the like. Furthermore, as another example of the configuration of the system 1, the master device may be connected to the small cell and the cell may be constructed under the small cell.

1.2. Configuration Example of Base Station

Figure 2:
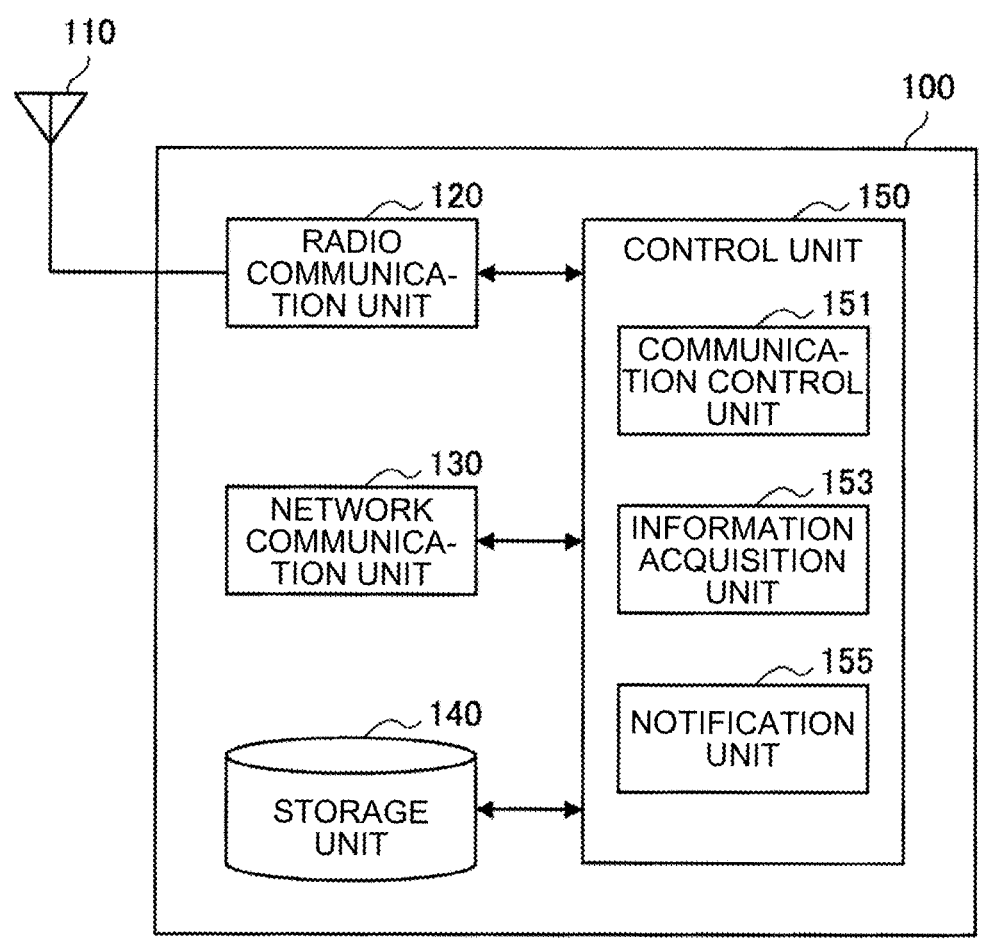
FIG. 2 is a block diagram illustrating an example of a configuration of a base station according to the same embodiment.

Next, the configuration of the base station 100 according to an embodiment of the present disclosure will be described with reference to FIG. 2. FIG. 2 is a block diagram illustrating an example of a configuration of the base station 100 according to an embodiment of the present disclosure. Referring to FIG. 2, the base station 100 includes an antenna unit 110, a radio communication unit 120, a network communication unit 130, a storage unit 140, and a control unit 150.

(1) Antenna Unit 110

The antenna unit 110 radiates the signal output by the radio communication unit 120 to space as a radio wave. Furthermore, the antenna unit 110 converts a radio wave in space into a signal and outputs the signal to the radio communication unit 120.

(2) Radio Communication Unit 120

The radio communication unit 120 transmits and receives signals. For example, the radio communication unit 120 transmits a downlink signal to the terminal device and receives an uplink signal from the terminal device.

(3) Network Communication Unit 130

The network communication unit 130 transmits and receives information. For example, the network communication unit 130 transmits information to another node and receives information from another node. For example, the other nodes include other base stations and core network nodes.

As described above, in the system 1 according to the present embodiment, the terminal device might operate as a relay terminal and relay the communication between a remote terminal and the base station in some cases. In such a case, for example, the radio communication apparatus 100C corresponding to the relay terminal does not have to include the network communication unit 130.

(4) Storage Unit 140

The storage unit 140 temporarily or permanently stores a program and various types of data for the operation of the base station 100.

(5) Control Unit 150

The control unit 150 provides various functions of the base station 100. The control unit 150 includes a communication control unit 151, an information acquisition unit 153, and a notification unit 155. The control unit 150 can further include other components other than these components. That is, the control unit 150 can perform operations other than the operations of these components.

The communication control unit 151 executes various processes related to the control of radio communication with the terminal device 200 via the radio communication unit 120. Furthermore, the communication control unit 151 executes various processes related to the control of communication with other nodes (for example, other base stations, core network nodes, or the like) via the network communication unit 130.

The information acquisition unit 153 acquires various types of information from the terminal device 200 and other nodes. The acquired information may be used, for example, for controlling radio communication with a terminal device, controlling for cooperation with other nodes, or the like.

The notification unit 155 notifies the terminal device 200 and other nodes of various types of information. As a specific example, the notification unit 155 may notify the terminal device of various types of information needed for the terminal device within the cell to perform radio communication with the base station. Furthermore, as another example, the notification unit 155 may notify another node (for example, another base station) of the information acquired from the terminal device in the cell.

1.3. Configuration Example of Terminal Device

Figure 3:
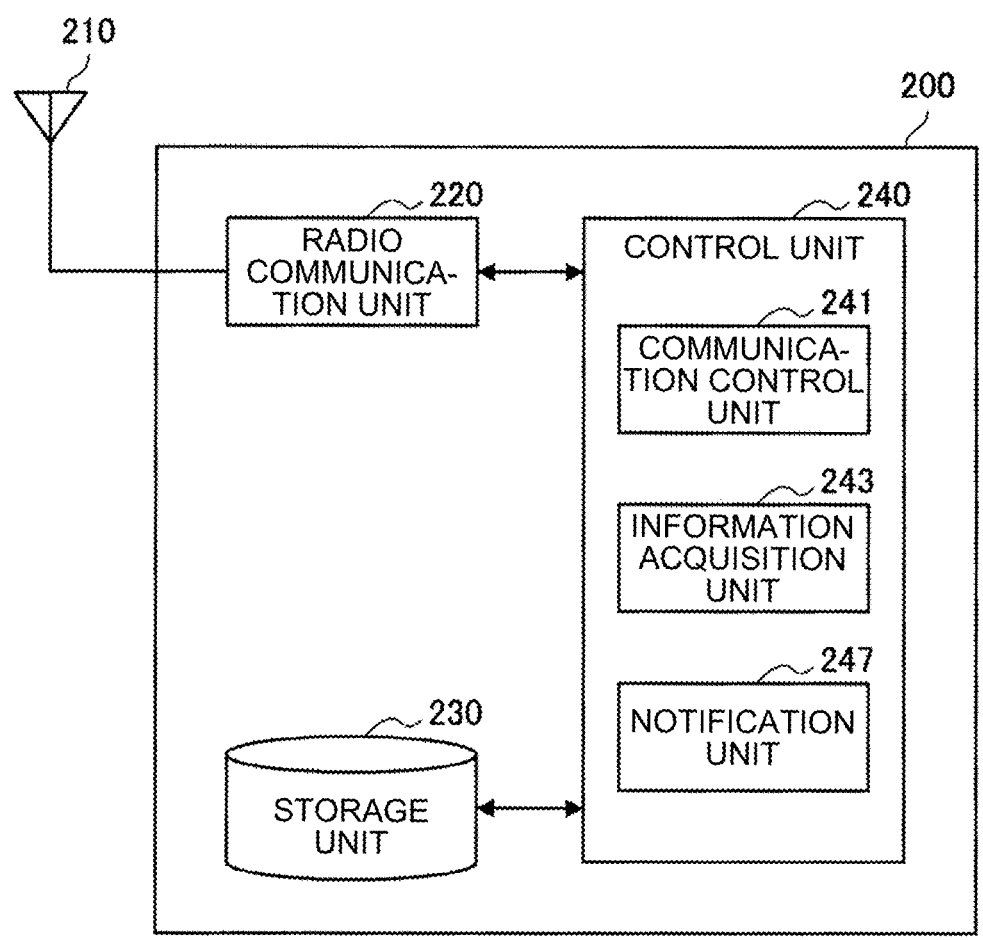
FIG. 3 is a block diagram illustrating an example of a configuration of a terminal device according to the same embodiment.

Next, an example of a configuration of the terminal device 200 according to the embodiment of the present disclosure will be described with reference to FIG. 3. FIG. 3 is a block diagram illustrating an example of a configuration of the terminal device 200 according to the embodiment of the present disclosure. As illustrated in FIG. 3, the terminal device 200 includes an antenna unit 210, a radio communication unit 220, a storage unit 230, and a control unit 240.

(1) Antenna Unit 210

The antenna unit 210 radiates the signal output by the radio communication unit 220 to space as a radio wave.

Furthermore, the antenna unit 210 converts a radio wave in space into a signal and outputs the signal to the radio communication unit 220.

(2) Radio Communication Unit 220

The radio communication unit 220 transmits and receives signals. For example, the radio communication unit 220 receives a downlink signal from the base station and transmits an uplink signal to the base station.

Furthermore, in the system 1 according to the present embodiment, the terminal device 200 directly communicates with another terminal device 200 without intervening the base station 100, in some cases. In this case, the radio communication unit 220 may transmit and receive a sidelink signal to and from another terminal device 200.

(3) Storage Unit 230

The storage unit 230 temporarily or permanently stores a program and various data for the operation of the terminal device 200.

(4) Control Unit 240

The control unit 240 provides various functions of the terminal device 200. For example, the control unit 240 includes a communication control unit 241, an information acquisition unit 243, and a notification unit 247. The control unit 240 can further include other components other than these components. That is, the control unit 240 can perform operations other than the operations of these components.

The communication control unit 241 executes various processes related to the control of radio communication with the base station 100 and another terminal device 200 via the radio communication unit 220. For example, the communication control unit 241 may reserve a resource to be used for transmission of a packet. Furthermore, the communication control unit 241 may select a part of the reserved resources and control to transmit the packet using the selected resource.

Furthermore, the communication control unit 241 may make a predetermined determination based on the information acquired from the base station 100 or another terminal device 200. As a more specific example, the communication control unit 241 may determine whether a packet can be transmitted to another terminal device 200. Furthermore, at this time, the communication control unit 241 may determine whether to drop the packet scheduled to be transmitted to the other terminal device 200.

The information acquisition unit 243 acquires various types of information from the base station 100 and other terminal devices 200. As a specific example, the information acquisition unit 243 may acquire information related to another terminal device 200 (for example, reception capability, etc.) from the other terminal device 200. Furthermore, the information acquisition unit 243 may acquire various types of information for selecting resources to be used for communication with another terminal device 200 from the base station 100 or the other terminal device 200. As a more specific example, the information acquisition unit 243 may acquire information related to the resources reserved by the other terminal device 200, from the other terminal device 200.

The notification unit 247 notifies the base station 100 and other terminal devices 200 of various types of information. As a specific example, the notification unit 247 may notify another terminal device 200 (for example, the terminal device 200 to which the data or packet is transmitted) of information related to the data or packet scheduled to be transmitted. Furthermore, the notification unit 247 may notify another terminal device 200 of information related to the resource reserved for use in transmitting the packet.

2. V2X Communication

Figure 4:
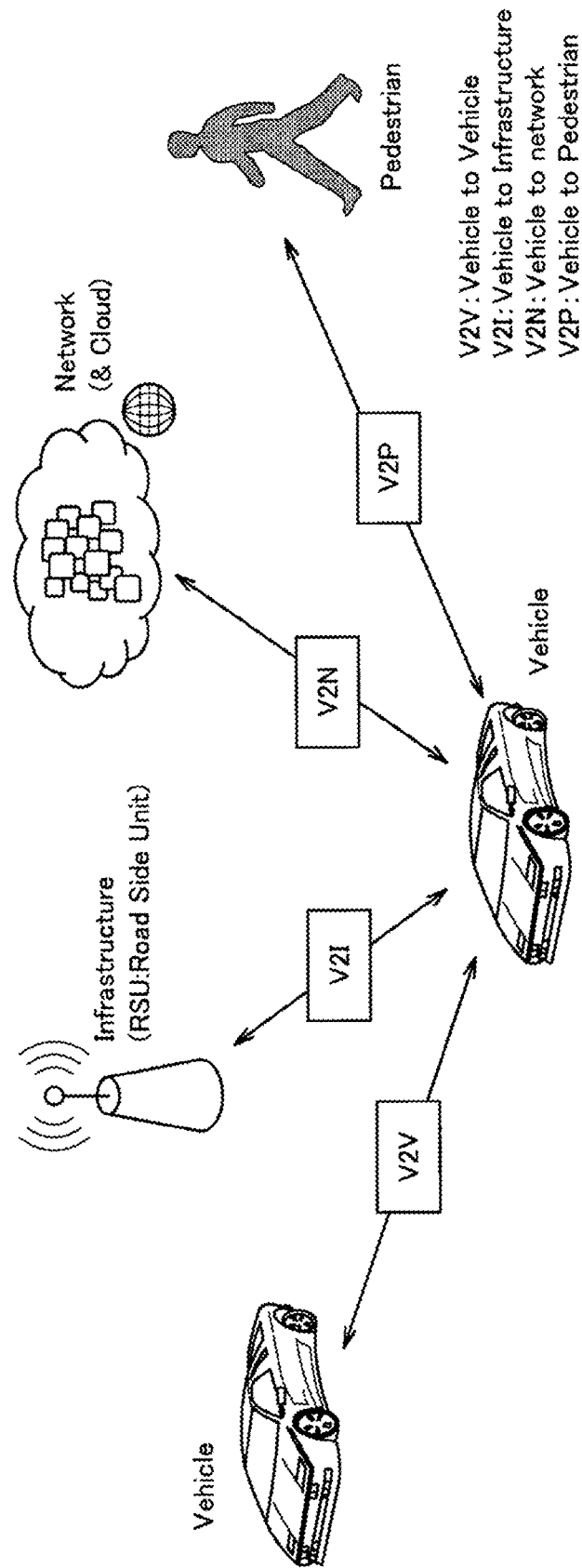
FIG. 4 is a diagram illustrating an outline of V2X communication.

Next, an outline of V2X communication will be described. V2X communication is an abbreviation for Vehicle-to-X communication, which is a system of communication between a vehicle and "something". For example, FIG. 4 is a diagram illustrating an outline of V2X communication. As illustrated in FIG. 4, for example, examples of "something" here include vehicles, infrastructure, networks, and pedestrians (also referred to as V2V, V2I, V2N, and V2P, respectively).

(Entire Concept of V2X Communication)

Figure 5:
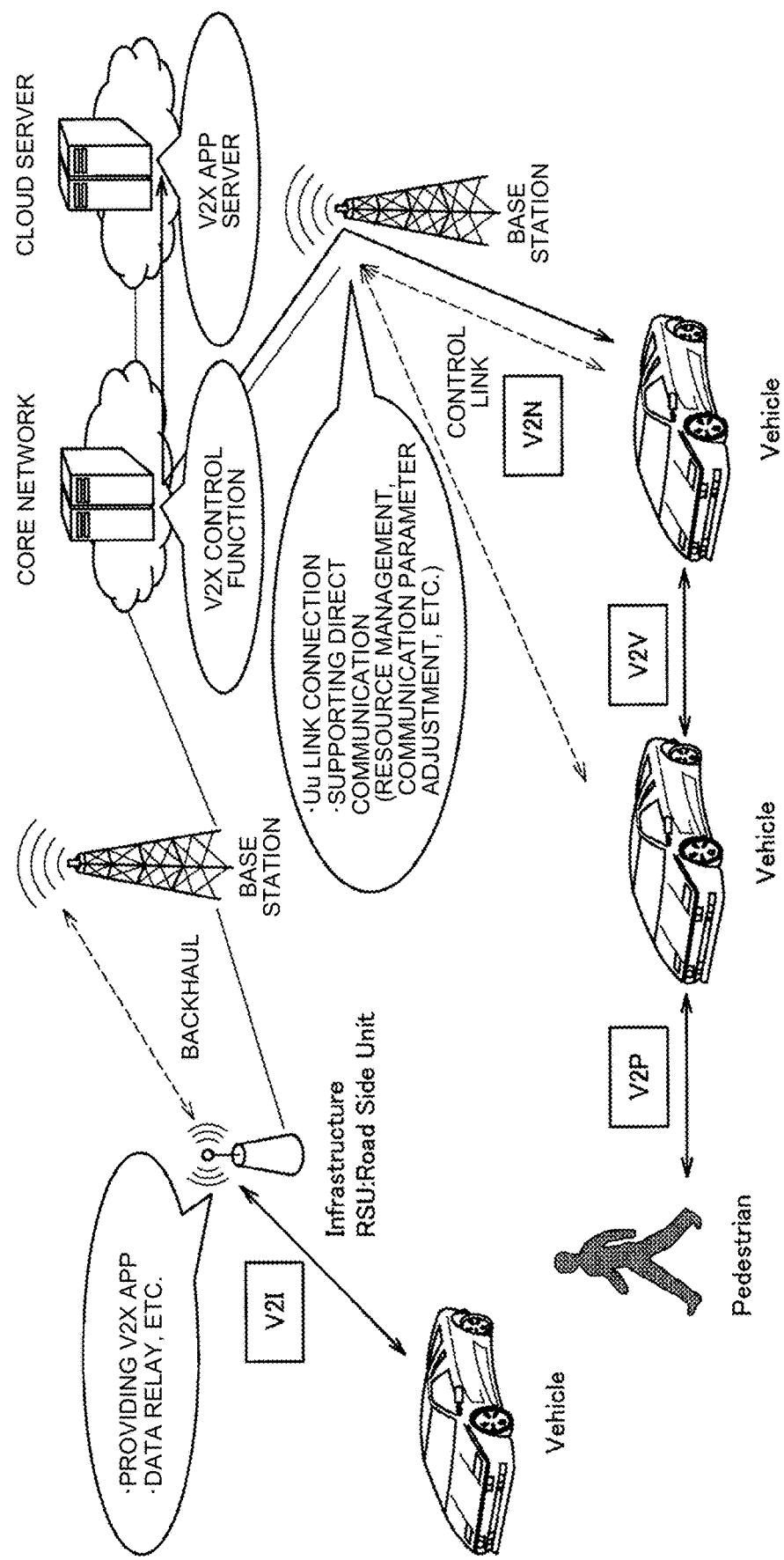
FIG. 5 is an explanatory diagram illustrating an example of an entire concept of V2X communication.

FIG. 5 is an explanatory diagram illustrating an example of an entire concept of V2X communication. In the example illustrated in FIG. 5, a V2X application server (APP server) is held as a cloud server, and the application server controls V2X communication on the core network side. The base station performs Uu-link communication with the terminal device, while performing communication control for direct communication such as V2V communication and V2P communication. In addition to the base station, a Road Side Unit (RSU) is disposed as a roadside infrastructure. There are two possible RSUs, a base station type RSU and a UE type RSU. V2X application (V2X APP) will be provided and support such as data relay will be provided for the RSU.

(Use Cases of V2X Communication)

Figure 6:
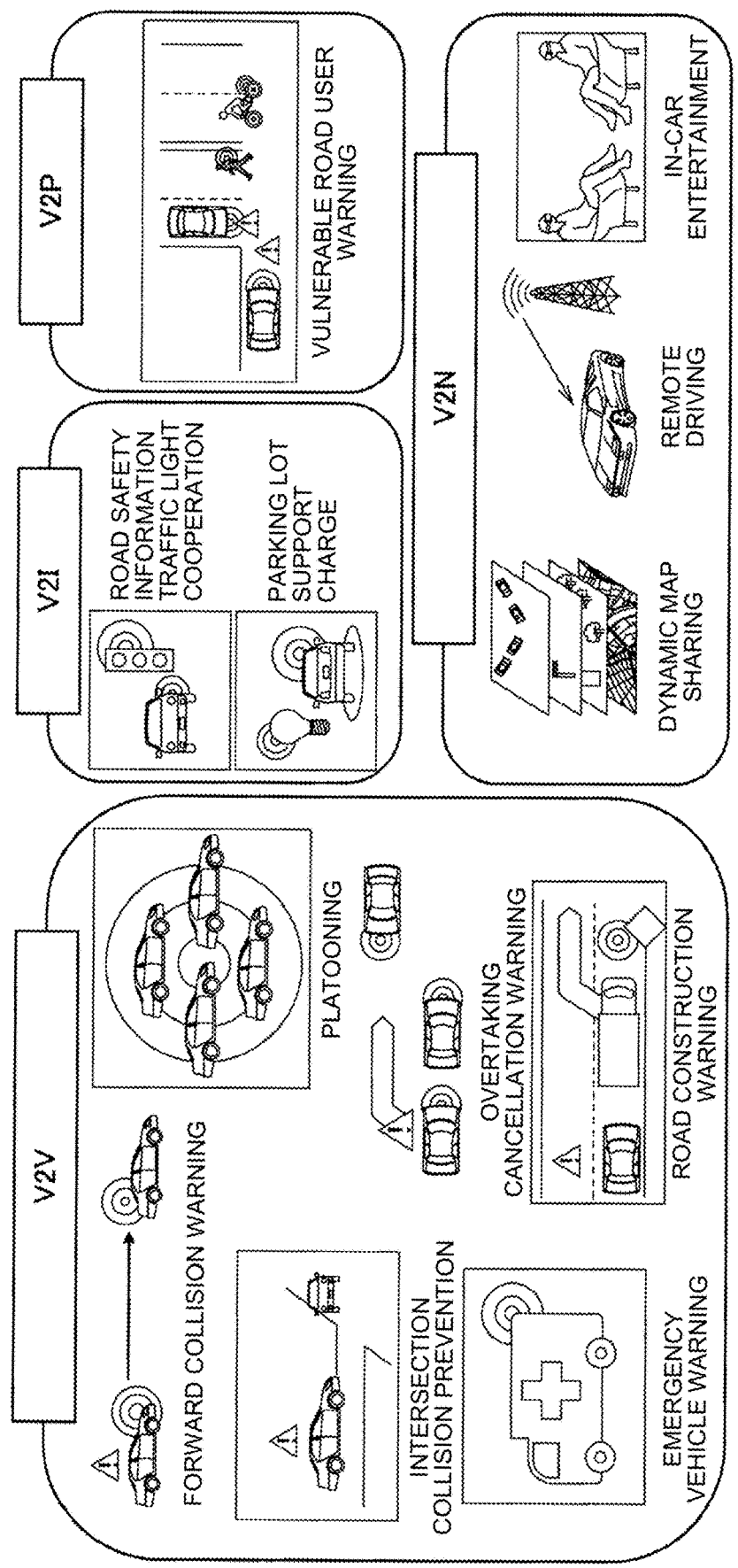
FIG. 6 is a diagram illustrating an example of a use case of V2X communication.

Regarding radio communication for automobiles, the development of 802.11p-based Dedicated Short Range Communication (DSRC) has been mainly promoted. In recent years, however, standardization of LTE-based in-vehicle communication, namely, "LTE-based V2X communication (or abbreviated as LTE-based V2X)" has been promoted. The LTE-based V2X communication has supported the exchange of basic safety messages or the like. On the other hand, with the aim of further enhancing the V2X communication, NR V2X communication using 5G technology (New Radio (NR)) has been discussed in recent years. For example, FIG. 6 is a diagram illustrating an example of a use case of V2X communication.

The NR V2X communication supports new use cases that require high reliability, low latency, high speed communication, and high capacity, which have been previously difficult to support with LTE-based V2X. Specific examples of the use case among the examples illustrated in FIG. 6 include providing a dynamic map, remote driving, or the like. In addition to this, there are other use cases such as sensor data sharing in which sensor data is exchanged as vehicle-to-vehicle communication or road-to-vehicle communication, and platooning use cases for platooning. Use cases and requirements for such NR V2X communications are specified in 3GPP TR 22.886. For reference, an outline of an example of a use case will be described below.

(1) Vehicles Platooning

This is a use case of platooning vehicles in which a plurality of vehicles forms a platoon and travels in a same direction. In this use case, information to control the platooning is exchanged between the vehicle leading the platooning and other vehicles. With such information exchange, it is possible to further reduce the inter-vehicle distance of platooning, for example.

(2) Extended Sensors

This is a use case in which sensor-related information (raw data before data processing, and data after processing) can be exchanged on a vehicle-to-vehicle basis. Sensor information is collected through local sensors, live video images (for example, live video images between the own vehicle and the surrounding vehicles, RSUs, or pedestrians), V2X application servers, or the like. The exchange of these pieces of information enables the vehicle to obtain information that cannot be obtained from its own sensor information, making it possible to perceive/recognize a wider range of environments. Note that this use case needs to exchange a large amount of information, and thus, needs a high data rate for communication.

(3) Advanced Driving

This is a use case that enables partially autonomous traveling and fully autonomous traveling. In this use case, the RSU shares the perceived/recognized information obtained from its own sensors or the like, with the surrounding vehicles, thereby enabling each of the vehicles to adjust the track and operation in synchronization with other vehicles. In addition, each of the vehicles can share the intention and plans regarding the driving with neighboring vehicles.

(4) Remote Driving

This is a use case for allowing a remote control operator or a V2X application to perform remote control. Remote control is used when another person drives on behalf of a person who has difficulty in driving, or when operating a vehicle in a dangerous district. Cloud computing-based maneuvers are applicable for public transportation in which routes and roads are fixed to some extent, for example. In this use case, high reliability and low transmission latency are required for communication.

(Physical Layer Enhancement)

In order to achieve the above requirements, further enhancement is required for the physical layer in the LTE V2X. Target links include Uu links and PC5 links (sidelinks). A Uu link is a link between an infrastructure such as a base station or a Road Side Unit (RSU), and a terminal device. The PC5 link (sidelink) is a link between terminal devices. The main points of enhancement are illustrated below.

Examples of enhancements include:
Channel format
Sidelink feedback communication
Sidelink resource allocation method
Vehicle position information estimation technology
Relay communication between terminals
Support for unicast communication and multicast communication
Multi-carrier communication, carrier aggregation
MIMO/beamforming
Frequency support for high frequency (example: 6 GHz or higher)

Furthermore, examples of the channel format include Flexible numerology, short Transmission Time Interval (TTI), multi-antenna support, and Waveform. Furthermore, examples of the sidelink feedback communication include HARQ, and Channel Status Information (CSI).

(V2X Operation Scenario)

An example of a V2X communication operation scenario is described below. V2N communication has a simple configuration because it has only DL/UL communication between a base station and a terminal device. In contrast, V2V communication is considered to have various communication paths. The following will describe individual scenarios by mainly focusing on the example of V2V communication. However, the similar communication operation can be applied to V2P and V2I as well. Note that the communication destination in V2P and V2I will be a pedestrian or an RSU, respectively.

Figure 7:
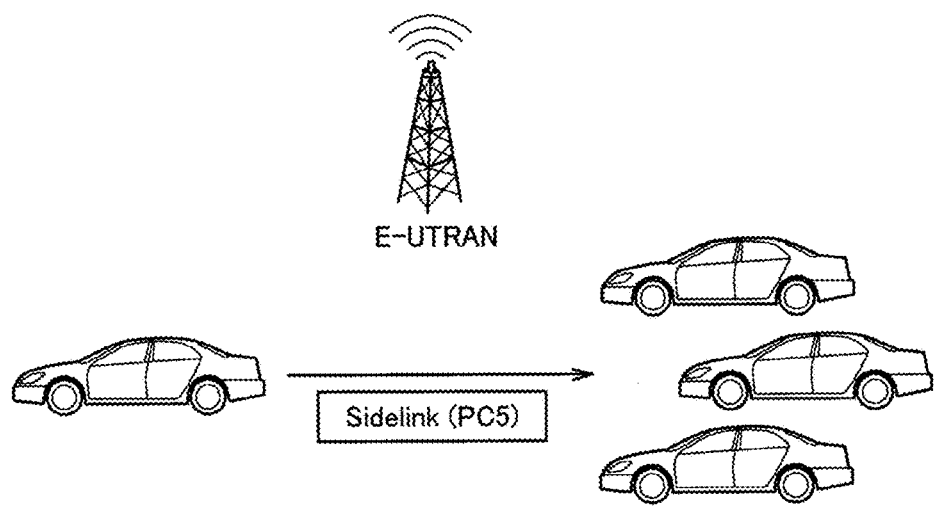
FIG. 7 is an explanatory diagram illustrating an example of a V2X operation scenario.
Figure 8:
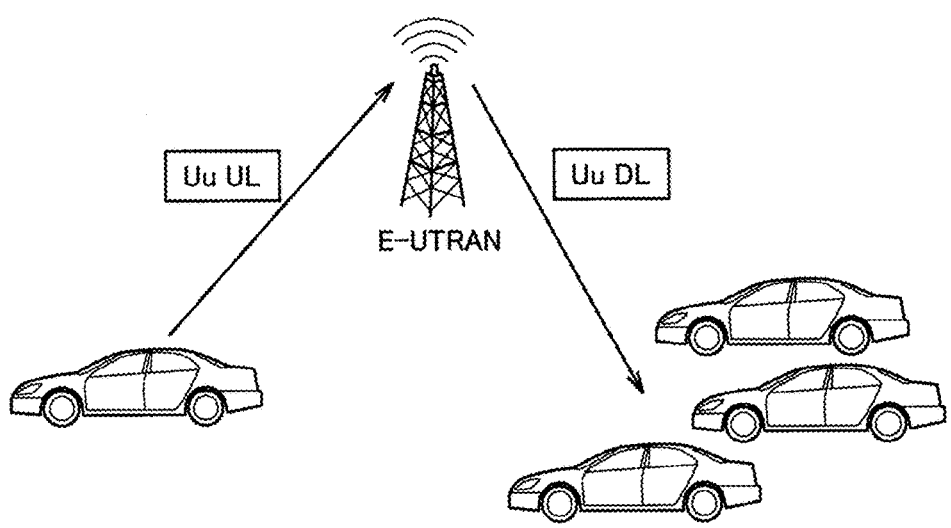
FIG. 8 is an explanatory diagram illustrating an example of a V2X operation scenario.
Figure 9:
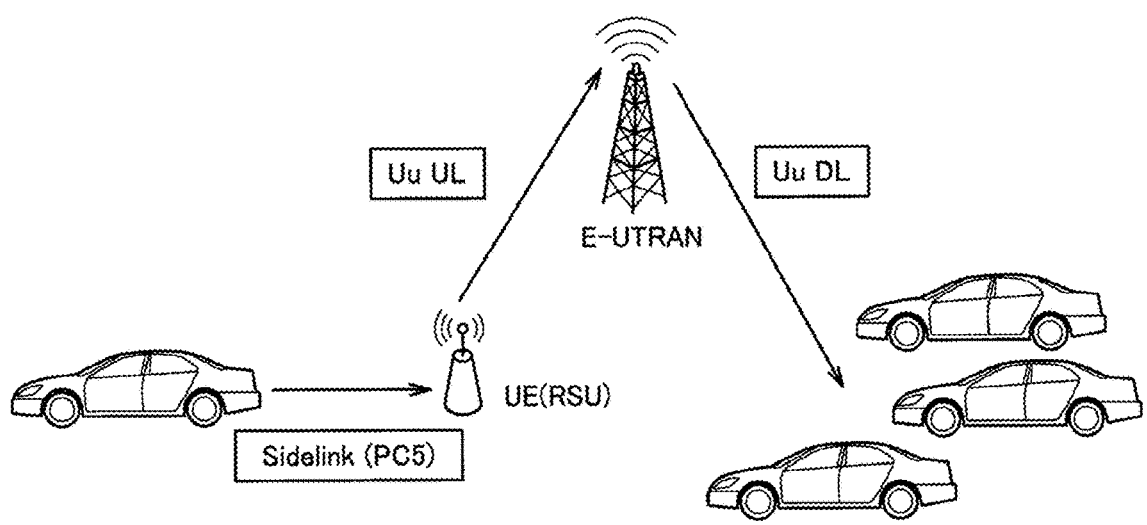
FIG. 9 is an explanatory diagram illustrating an example of a V2X operation scenario.
Figure 10:
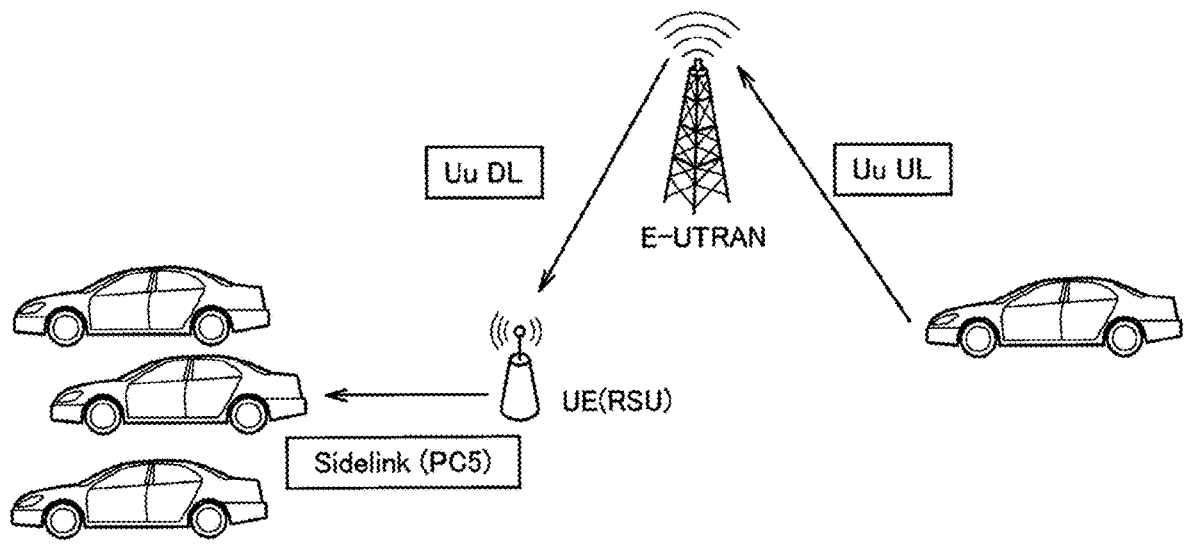
FIG. 10 is an explanatory diagram illustrating an example of a V2X operation scenario.
Figure 11:
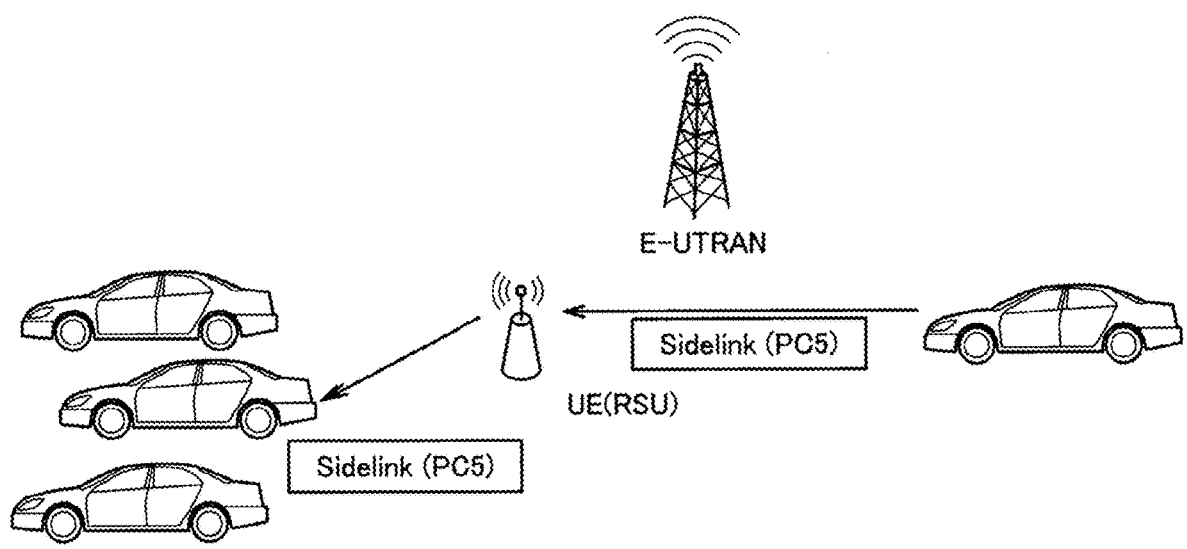
FIG. 11 is an explanatory diagram illustrating an example of a V2X operation scenario.
Figure 12:
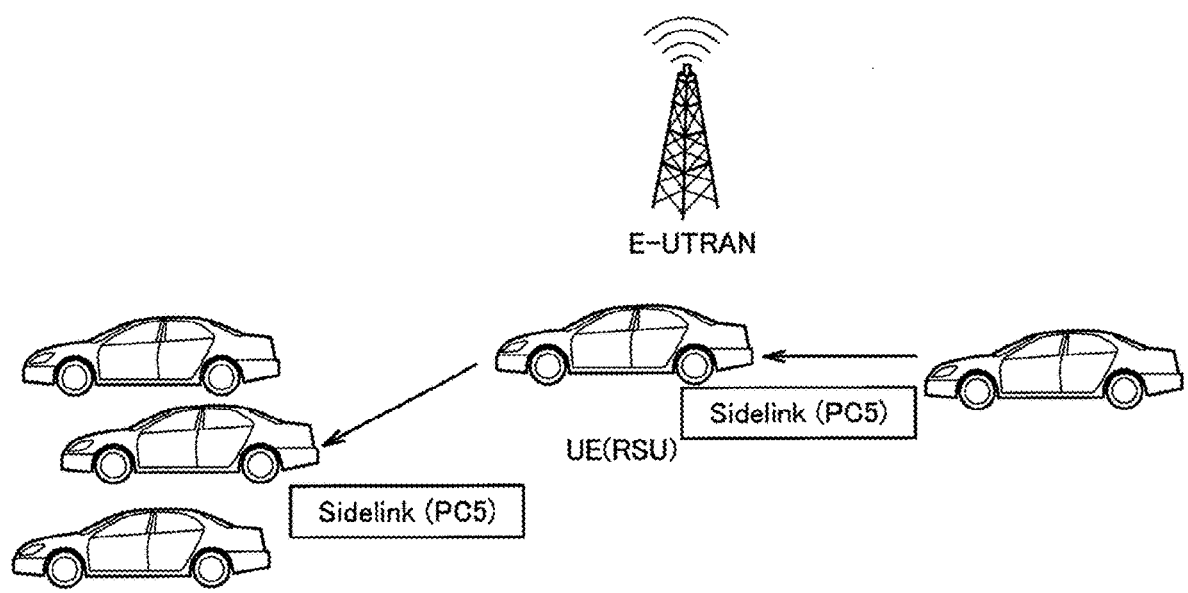
FIG. 12 is an explanatory diagram illustrating an example of a V2X operation scenario.

For example, FIGS. 7 to 12 are views illustrating an example of a V2X operation scenario. Specifically, FIG. 7 illustrates a scenario in which vehicles communicate directly with each other without intervening a base station (E-UTRAN). FIG. 8 illustrates a scenario in which vehicles communicate with each other via a base station. FIGS. 9 and 10 illustrate a scenario in which vehicles communicate with each other via a terminal device (UE, here RSU) and a base station. FIGS. 11 and 12 illustrate scenarios in which vehicles communicate with each other via a terminal device (UE, here RSU, or another vehicle).

In addition, in FIGS. 7 to 12, the "sidelink" corresponds to a communication link between terminal devices and is also referred to as PC5. Specific examples of sidelinks include V2V, V2P, and V2I communication links. The "Uu interface" corresponds to a radio interface between a terminal device and a base station. A specific example of a Uu interface is a V2N communication link. The "PC5 interface" corresponds to a radio interface between terminal devices.

3. Method of Allocating Resources to Sidelinks

The present embodiment focuses on the resource allocation method of the V2V communication link in NR V2X communication. The LTE sidelink control channels (Physical Sidelink Control Channel (PSCCH)) and data channel (Physical Sidelink Shared Channel (PSSCH)) use LTE radio frames. In some cases, the NR V2X supports different types of services, such as enhanced Mobile Broadband (eMBB) and Ultra-Reliable and Low Latency Communications (URLLC) for a single car. In particular, using LTE frame structures in the URLLC communications might be insufficient to meet the requirements of ultra-latency, and thus, it is considered to be preferable to use the numerology and frame structures of the NR. In other words, it is desirable, in NR V2X, to use the numerology and frame structures of NR for sidelinks of the NR in order to meet requirements of different services.

On the other hand, applying the numerology or frame structures of the NR to the sidelink would lead to problems that decoding by the LTE V2X sensing method fails, or the sensing result is affected in a case where the frame structure differs from the LTE frame structure. When traffics with different frame structures coexist, simultaneous sensing using existing methods would not be possible. Furthermore, in a case where LTE and NR vehicles coexist, vehicles using LTE communication cannot read the packets transmitted from vehicles using NR communication because NR does not have backward compatibility, This would affect the sensing results of vehicles using LTE communication.

Therefore, in the present embodiment, NR V2X sensing capable of supporting NR numerology and frame structures will be described.

First, the outline of the resource selection method for the sidelink in the LTE sensing result will be described.

Figure 13:
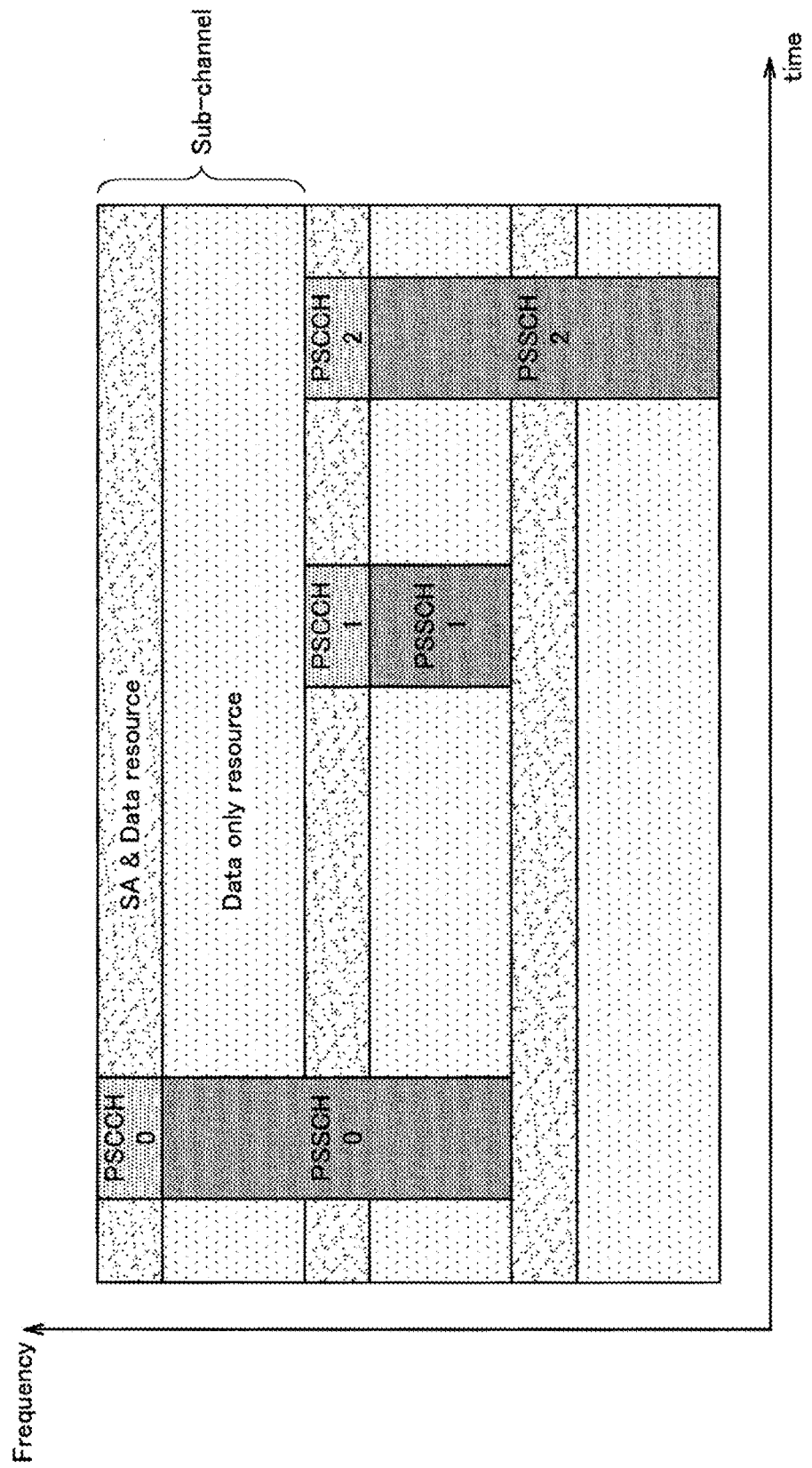
FIG. 13 is a diagram illustrating an example of a configuration of resources allocated to sidelink communication.

For example, FIG. 13 is a diagram illustrating an example of a configuration of resources (resource pools) allocated to sidelink communication, illustrating an example of a case where frequency division multiplexing (FDM) is applied. As illustrated in FIG. 13, the resource pool is divided into a Scheduling Assignment (SA) region and a Data region, and PSCCH (Physical Sidelink Control Channel) and PSSCH (Physical Sidelink Shared Channel) are transmitted by individual regions. In the following, the description will be focused on an exemplary case where FDM is applied as illustrated in FIG. 13. However, the application target of the technology according to the present disclosure is not necessarily limited to this example. As a specific example, even when Time Division Multiplexing (TDM) is applied, it is also possible to apply the technique according to the present disclosure described below. When TDM is applied, the SA region and the Data region are orthogonal on the time axis.

Methods of resource allocation to the sidelink include a method of "Mode 3 resource allocation" in which the base station allocates the resource of the sidelink and a method of "Mode 4 resource allocation" in which the terminal device performs sensing and selects the resource of the sidelink. In the case where the terminal device selects a resource by itself, the terminal device randomly selects the resource, or senses the past resource usage status and then selects the resource based on the sensing result.

Mode 4 Resource Allocation

Figure 14:
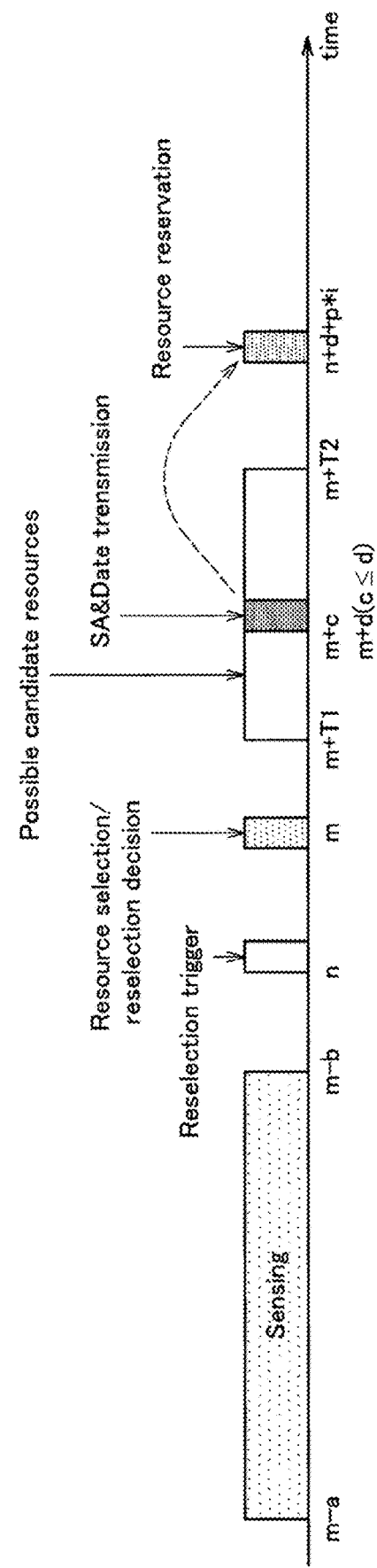
FIG. 14 is an explanatory diagram illustrating an example of an operation timeline when a terminal device transmits a packet based on Mode 4 resource allocation.

An overview of Mode 4 resource allocation will be presented with reference to FIG. 14. FIG. 14 is an explanatory diagram illustrating an example of an operation timeline when a terminal device transmits a packet based on Mode 4 resource allocation. As illustrated in FIG. 14, the terminal device that transmits a packet first performs sensing in order to discover, from the resource pool, a resource used for transmitting the packet. Next, the terminal device selects a resource from the resource pool based on the result of the sensing. Subsequently, the terminal device transmits the packet using the selected resource. Furthermore, at this time, the terminal device reserves a resource to be used for subsequent packet transmission, as necessary.

In LTE V2X, two sensing methods, SA decoding and Energy measurement, are supported as sensing. The terminal device performs these sensing methods simultaneously and performs resource selection.

SA decoding is a sensing method that decodes the control channel transmitted from the terminal device. This makes it possible to judge whether future resources are reserved in SA information. However, this method has a disadvantage that an occurrence of a failure in the SA signal decoding leads to a state where the resource occupancy status of the data region cannot be grasped. Even in a case where it is found that the terminal device is occupied by the SA signal, the power level in the data region might actually be below an allowable level when the terminal device on the transmitting side is sufficiently away from the position of the terminal device on the receiving side. Since it is not possible to measure up to the power level of the data region only by SA decoding, there is a concern that the resources that can actually be used might be excluded as the one that cannot be used for transmission.

To handle the above problem, it has been agreed that LTE V2X will use Energy measurement in combination with SA decoding. Energy measurement can complement SA decoding because it can measure actual resource usage status at power level.

Figure 15:
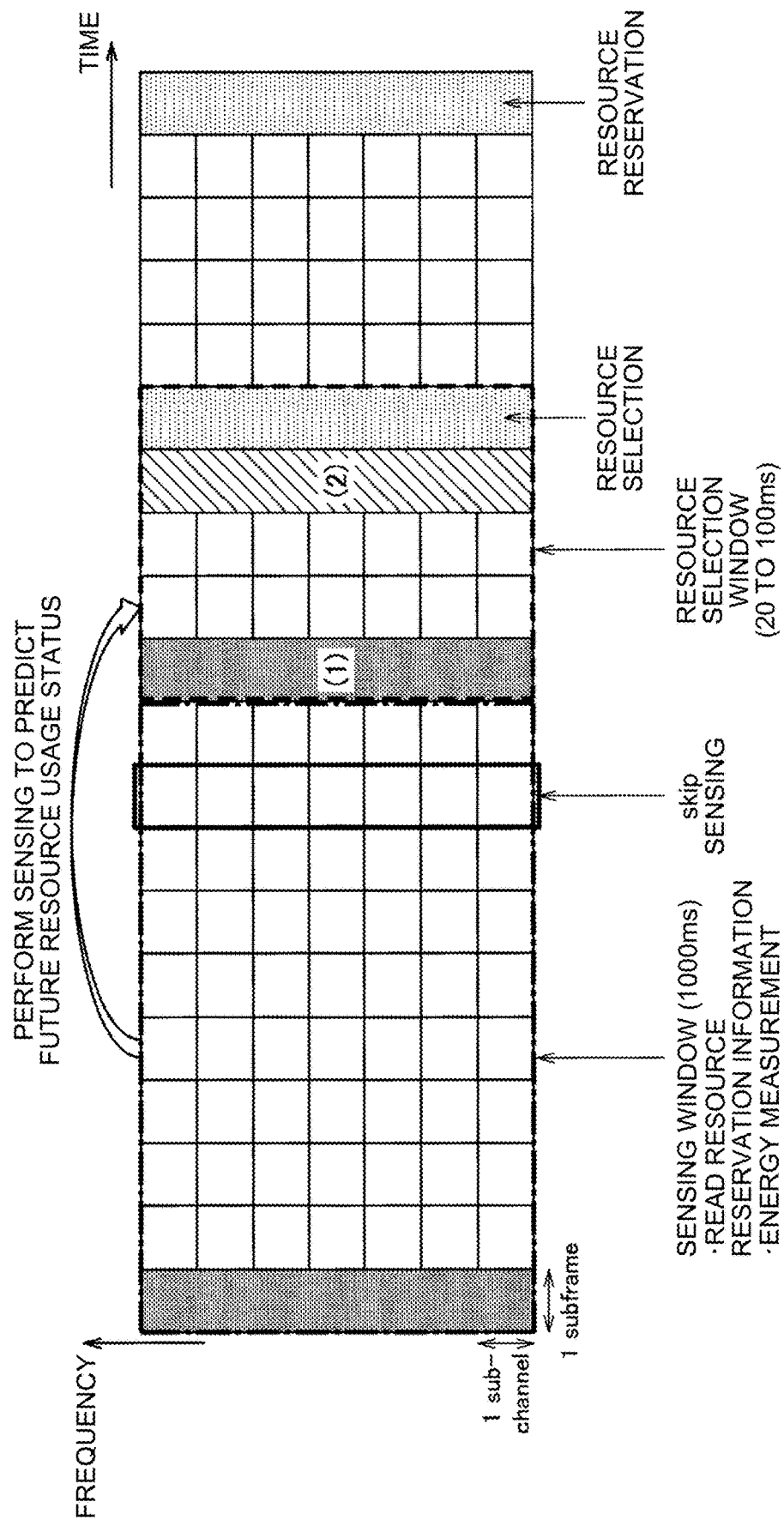
FIG. 15 is an explanatory diagram illustrating a sensing operation in LTE V2X.

FIG. 15 is an explanatory diagram illustrating a sensing operation in LTE V2X. FIG. 15 illustrates an example of a sensing operation for selecting a resource from a resource pool.

Specifically, the terminal device selects a resource in a resource selection window and reserves a future resource based on the power measurement result in a sensing window and the resource reservation status in the sensing window. As a specific example, in the example illustrated in FIG. 15, at an occurrence of a packet to be transmitted, the terminal device predicts the future resource usage status, for example, the resource used for transmission of another packet in the future, based on the sensing result. By using the result of the prediction, the terminal device can select and reserve a resource that can be used for transmitting the packet, that is, a resource that is predicted not to be used for transmitting another packet.

Figure 16:
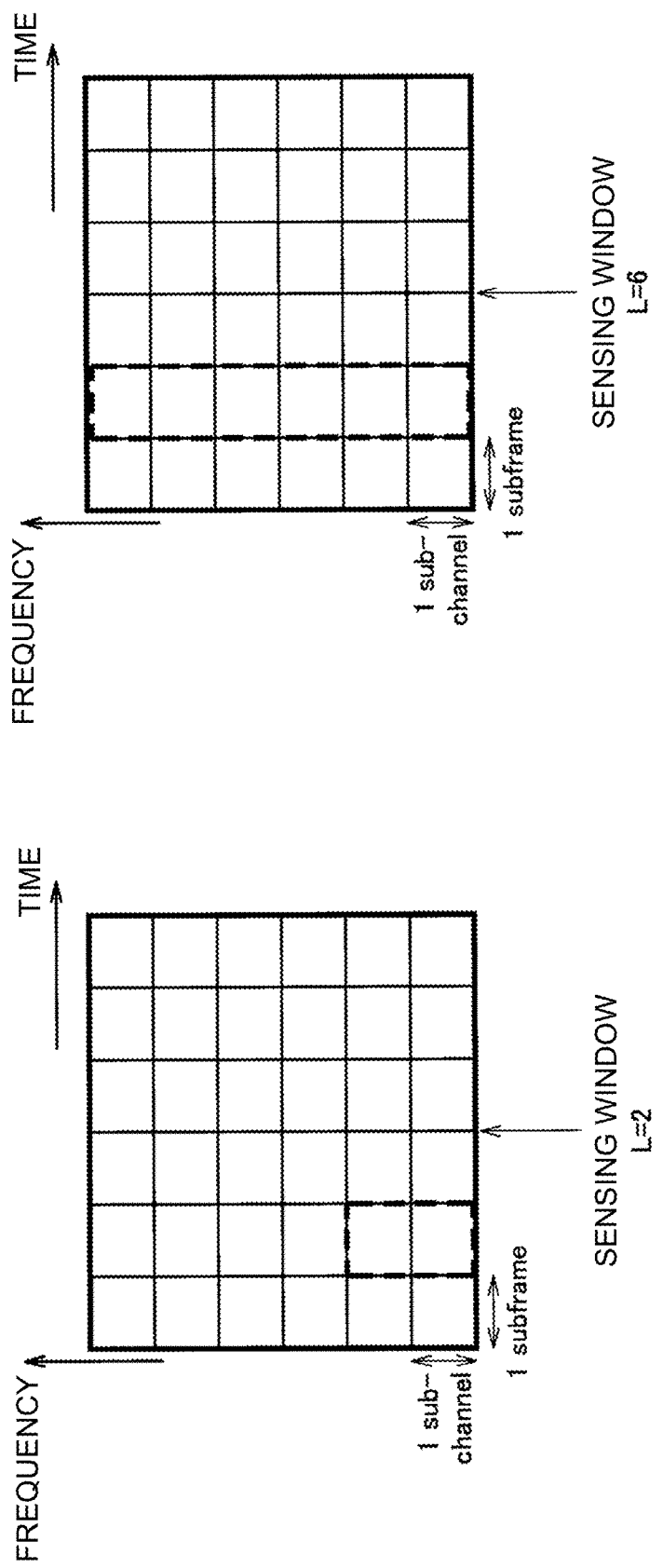
FIG. 16 is an explanatory diagram illustrating the sensing operation in LTE V2X in more detail.

FIG. 16 is an explanatory diagram illustrating the sensing operation in LTE V2X in more detail. First of all, regarding the range of sensing in the case of LTE V2X, a Mode 4 terminal device constantly performs background sensing. However, in order to select the resource, the terminal device uses the sensing result during one subframe period before the transmission resource selection timing. Next, regarding the unit of sensing, in the case of LTE V2X, the terminal device performs sensing for each of subframes on the time axis and performs sensing for each of L subchannels on the frequency axis. L is the number of subchannels needed for transmission for each of subframes. For example, as illustrated in the figure on the left side of FIG. 16, in a case where two subchannels are required in one subframe (that is, L=2), the terminal device performs sensing in units of one subframe×2 subchannels. Furthermore, as illustrated in the figure on the right side of FIG. 16, in a case where six subchannels are required in one subframe (that is, L=6), the terminal device performs sensing in units of one subframe×6 subchannels.

Figure 17:
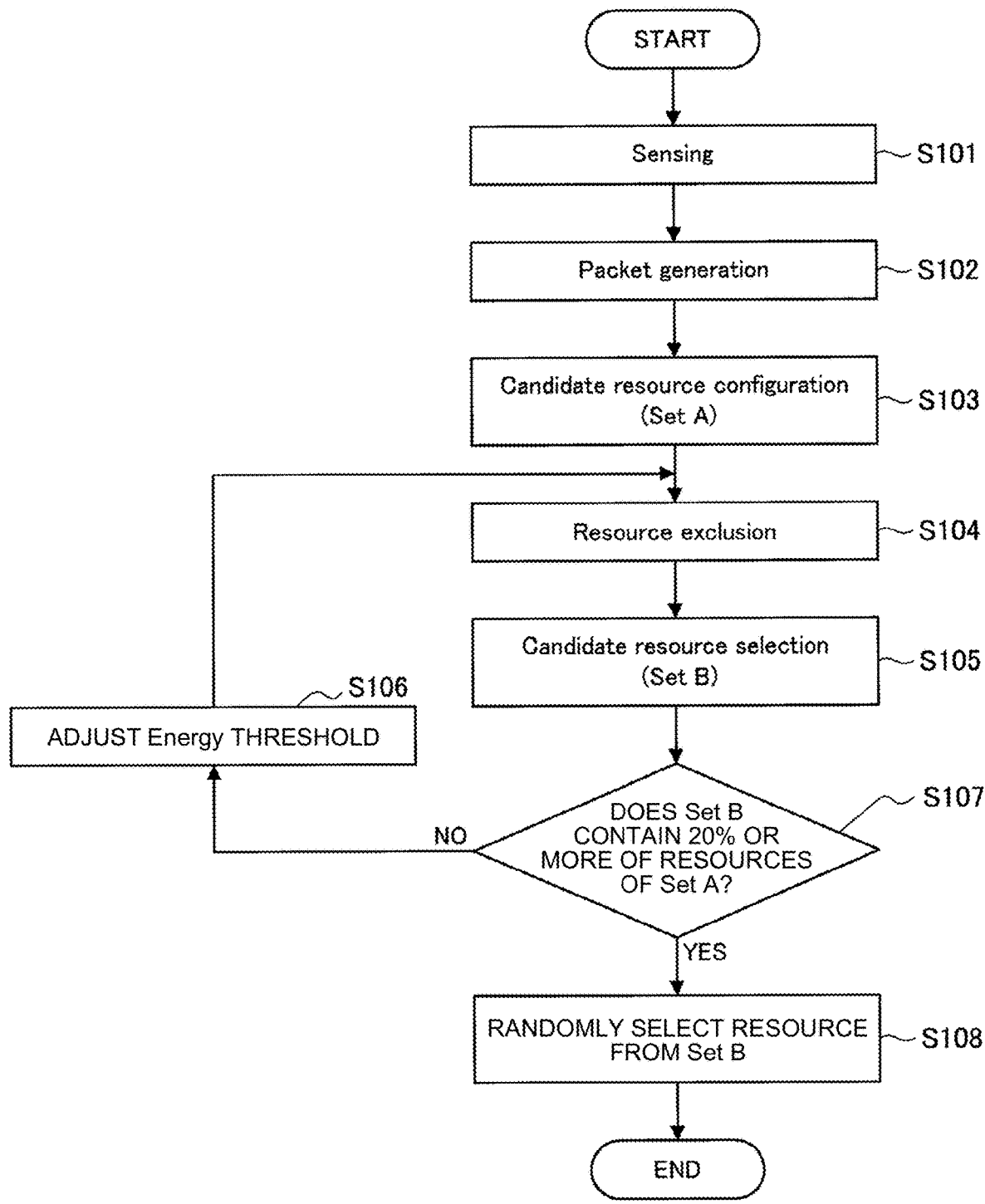
FIG. 17 is a flowchart illustrating an operation example of a terminal device.

FIG. 17 is a flowchart illustrating an operation example of a terminal device, specifically illustrating an operation when selecting a resource by sensing.

The terminal device first senses the resource pool (Step S101). When a packet is generated (Step S102), the terminal device sets a resource candidate (set A) that satisfies a latency requirement (Step S103). This resource candidate corresponds to the resource selection window in FIG. 15. Subsequently, the terminal device performs exclusion of a resource (Step S104). Specifically, in a case where the terminal device has skipped sensing of one subframe of m−100*k (k=1, 2 . . . 10) in the sensing window, the terminal device excludes, from the above resource candidates, a m-th resource of the resource candidates. With this operation, the resource illustrated by "2" in FIG. 15 is to be excluded, for example. Furthermore, in a case where the resources in the resource candidates is reserved by SA decoding, and where the Reference Signal Received Power (RSRP) is higher than a prescribed threshold (Th), the terminal device will exclude, from the above resource candidates, the reserved resource of the resource candidates. With this operation, the resource illustrated by "1" in FIG. 15 is to be excluded, for example.

Subsequently, the terminal device newly sets a resource candidate (set B) with the resource excluded in Step S104 from the resource candidate (set A) set in Step S103 (Step S105). The terminal device then judges whether set B contains 20% or more of the resources of set A (Step S106). In a case where set B contains less than 20% of the resources of set A (Step S106, No), the terminal device raises the threshold (Th) by 3 dB (Step S107) and re-executes the process of Step S104. In a case where set B contains 20% or more of the resources of set A (Step S106, Yes), the terminal device randomly selects a resource from the resource candidates of set B (Step S108) and transmits a packet.

4. NR Frame Structure

Figure 18:
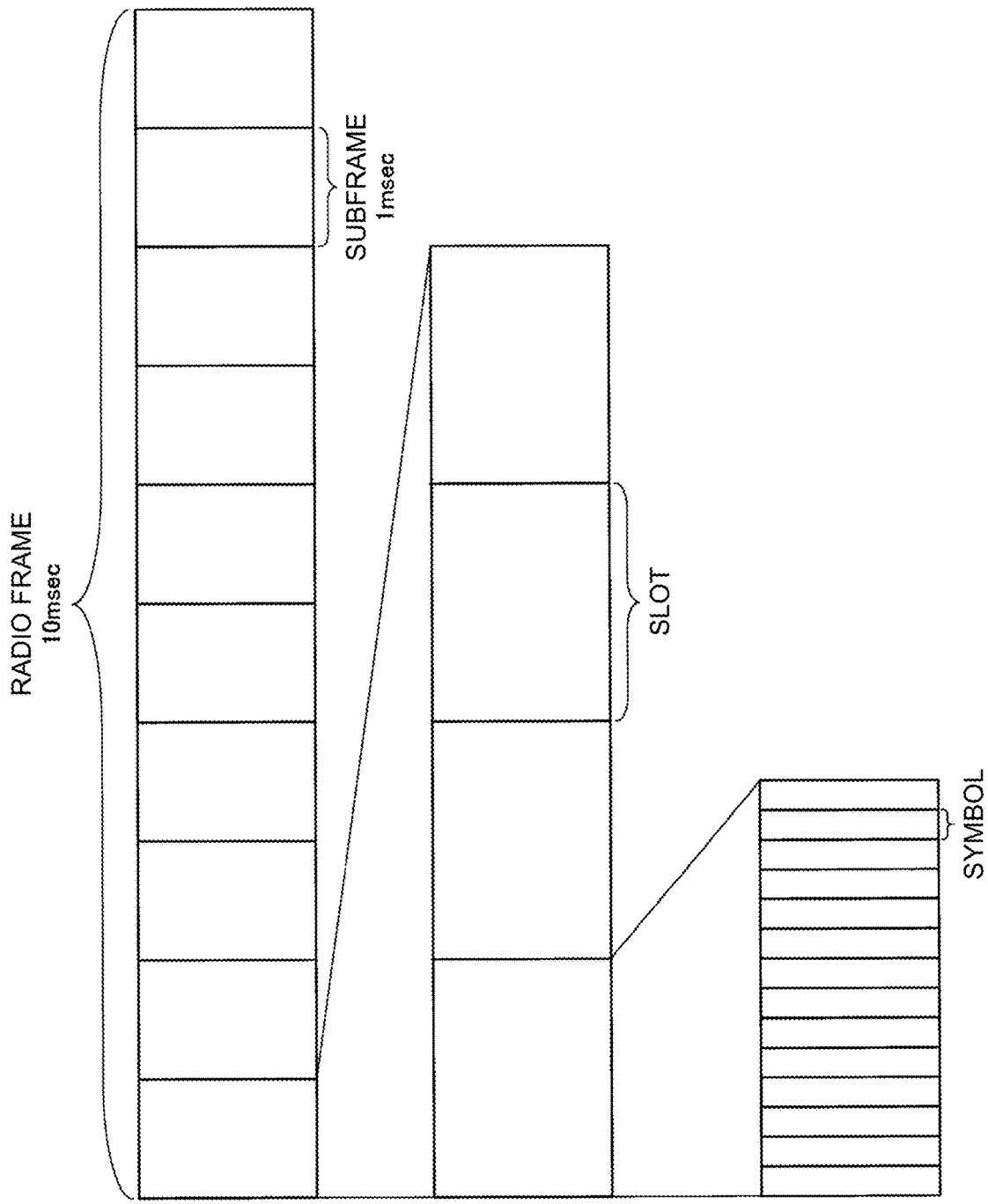
FIG. 18 is an explanatory diagram illustrating an example of an NR frame structure.

Next, the frame structure of NR will be described. FIG. 18 is an explanatory diagram illustrating an example of the frame structure of NR. Each of radio frames formed of 10 ms includes two half frames. The time interval of the half frame is 5 ms. Each of the half frames is formed of five subframes. The time interval of the subframe is 1 ms. One subframe is formed of one or more slots. The time interval of one slot depends on the numerology (OFDM numerology). Numerology is defined by a combination of subcarrier spacing (SCS) and cyclic prefix (CP). The subcarrier spacing supported in the present embodiment is defined by a power factor of 2 with respect to 15 kHz. Specifically, examples of subcarrier spacings that are supported include 15 kHz, 30 kHz, 60 kHz, 120 kHz, and 240 kHz. Slot time intervals are 1 ms for subcarrier spacing of 15 kHz, 0.5 ms for subcarrier spacing of 30 kHz, 0.25 ms for subcarrier spacing of 60 kHz, 0.125 ms for subcarrier spacings of 120 kHz, and 0.0625 ms for subcarrier spacings of 240 kHz. One slot includes 14 symbols for a normal CP and 12 symbols for an extension CP. Table 1 is a table illustrating the subcarrier spacing setting.

TABLE1

| Subcarrier spacing setting $\mu$ | Subcarrier spacing [kHz] | Cyclic prefix | Number of symbols per slot | Number of slots per radio frame | Number of slots per subframe |
| --- | --- | --- | --- | --- | --- |
| 0 | 15 | Normal CP | 14 | 10 | 1 |
| 1 | 30 | Normal CP | 14 | 20 | 2 |
| 2 | 60 | Normal CP Extension CP | 14 12 | 40 | 4 |
| 3 | 120 | Normal CP | 14 | 80 | 8 |
| 4 | 240 | Normal CP | 14 | 160 | 16 |

(Table 1: Subcarrier spacing setting)

5. Resource Grid

Figure 19:
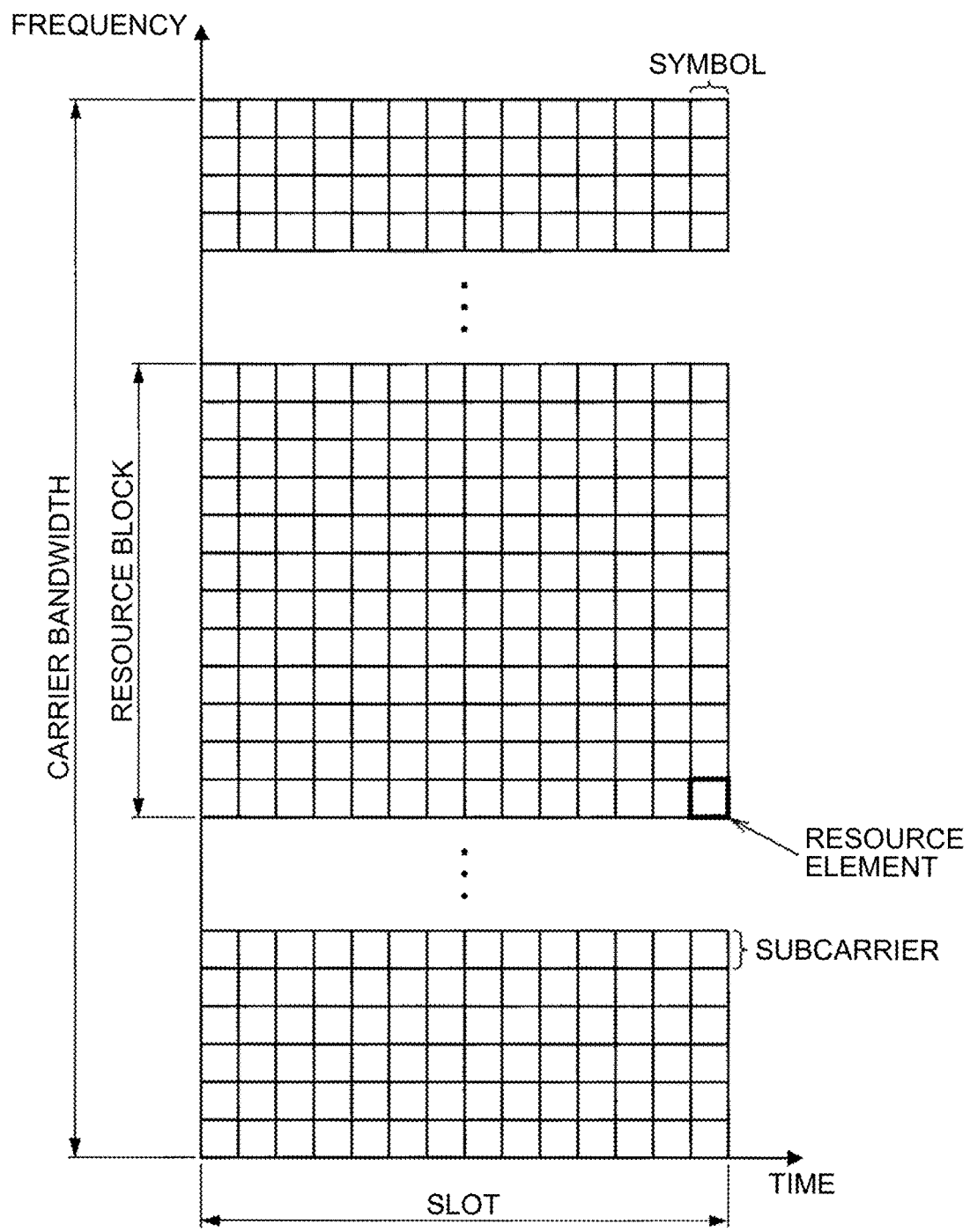
FIG. 19 is an explanatory diagram illustrating an example of a resource grid.

In the present embodiment, a physical signal or a physical channel transmitted in individual numerologies and carriers is represented by a resource grid. FIG. 19 is an explanatory diagram illustrating an example of the resource grid. A resource grid is defined by a plurality of resource elements. One resource element in a predetermined antenna port is represented by one subcarrier and one symbol. An index of the resource element at a predetermined antenna port can be represented by a combination of a subcarrier index and a symbol index.

Furthermore, in the present embodiment, a resource block which is a unit on the frequency axis is defined. One resource block ((RB) also referred to as a physical resource block (PRB)) is formed of 12 consecutive subcarriers on the frequency axis. Examples of the resource block include a common resource block (CRB), a physical resource block (PRB), and a virtual resource block (VRB). A common resource block is a resource block defined by a predetermined bandwidth and a predetermined numerology. In all numerologies, the common resource block starts at Point A. The frequency designated at point A is the center of subcarrier #0 of common resource block #0 in all numerologies. A physical resource block is a resource block defined within a predetermined bandwidth part. A physical resource block index is numbered from 0 within the predetermined bandwidth part. The virtual resource block is a logical resource block and is used at the time of mapping from a precoding-processed signal of a Physical Downlink Shared Channel (PDSCH) or a Physical Uplink Shared Channel (PUSCH) to a physical resource block.

6. Slot Format

In a TDD cell (Unpaired spectrum), each of the 14 symbols in the slot can be classified into symbol states of downlink (DL, D), uplink (UL, U), or flexible (F). The downlink symbol can be used for reception on the terminal device. The uplink symbol can be used for transmission on the terminal device. The flexible symbols can be used for transmission or reception on the terminal device. Furthermore, the flexible symbol may be used as a switching section (Switching Period) or a guard section (Guard Period) between the downlink and the uplink.

The state of these symbols is designated by TDD setting information common to the terminal devices (TDD-UL-DL-ConfigCommon), TDD setting information for individual terminal devices (TDD-UL-DL-ConfigDedicated), and/or the slot format index carried by DCI.

The TDD setting information common to terminal devices includes information regarding the number of downlink slots and downlink symbols, the number of uplink slots and uplink symbols, and the uplink/downlink switching period. The TDD setting information common to terminal devices includes information regarding all downlinks (all DL), all uplinks (all UL), or the number of downlink symbols and uplink symbols, for each of the symbols. The slot format index is a slot format index that represents a combination of 14 symbol states, and is designated in units of slots. The format that indicates the slot format is also referred to as a slot format indicator (SFI).

Figure 20:
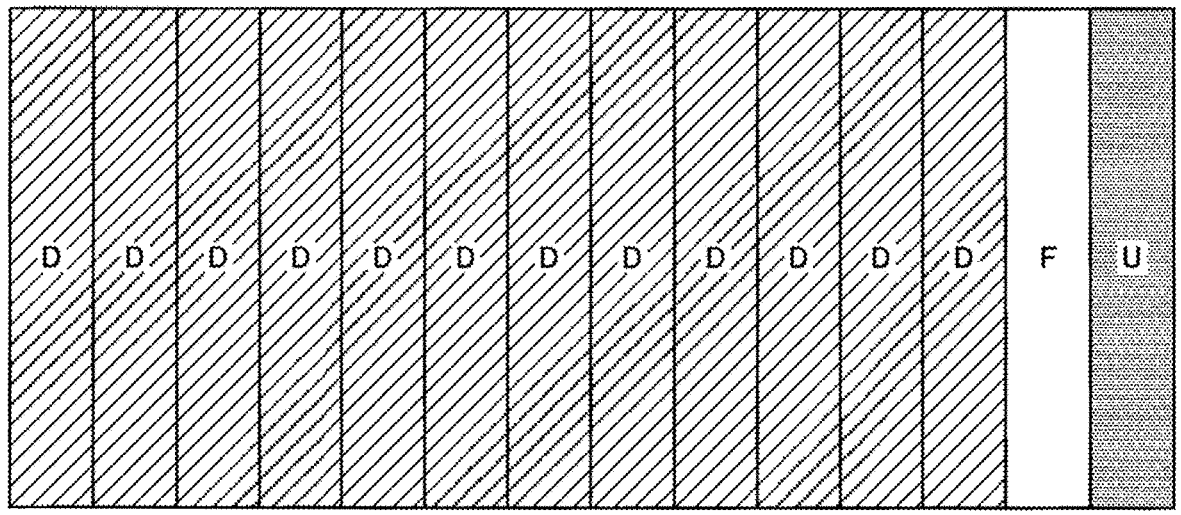
FIG. 20 is an explanatory diagram illustrating an example of a slot format.
Figure 21:
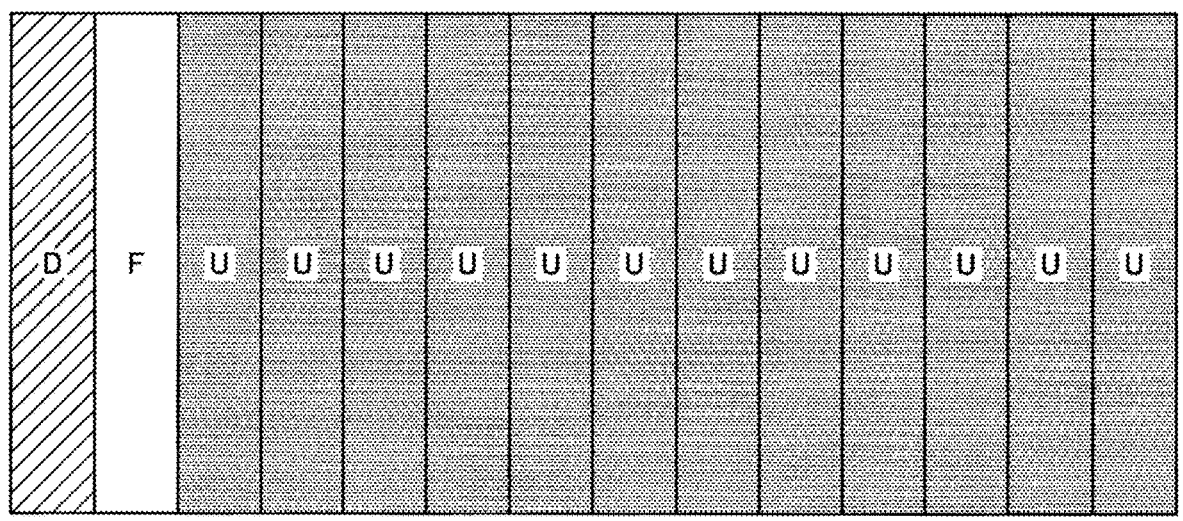
FIG. 21 is an explanatory diagram illustrating an example of a slot format.

The TDD setting or slot format described above makes it possible to flexibly switch between uplink and downlink in units of symbols. FIGS. 20 and 21 are views illustrating an example of the slot format. In FIG. 20, the first to twelfth symbols represent the downlink symbol, the thirteenth symbol represents the flexible symbol, and the fourteenth symbol represents the uplink symbol. The SFI of this slot represents "DDDDDDDDDDDDFU" in order from the first symbol of the slot. With this configuration, PDSCH and corresponding HARQ-ACK can be transmitted and received in a same slot. In FIG. 21, the first symbol represents the downlink symbol, the second symbol represents the flexible symbol, and the third to fourteenth symbols represent the uplink symbols. The SFI of this slot represents "DFUUUUUUUUUUUU" in order from the symbol of the slot. With this configuration, a UL grant and the corresponding PUSCH can be transmitted and received in a same slot.

7. Changing Units of Sensing for Each of Numerologies and Frame Structures

In conventional sensing, the sensing has been performed on the resources in the unit same as the resource block needed for transmission. Specifically, as described above, sensing has been performed in units of 1 subframe×L subchannel, that is, 1 subframe×M PRB (L is the number of subchannels needed for transmission, M=L×sizeSubchannel, in which sizeSubchannel is the number of PRBs contained in one subchannel).

In NR V2X, in one resource pool, the terminal device on the transmitting side can perform transmission using different numerologies. In such a case, when the transmitting terminal device selects the resource by the existing LTE V2X sensing, the result of Energy measurement might not reflect the resource usage status.

Figure 22:
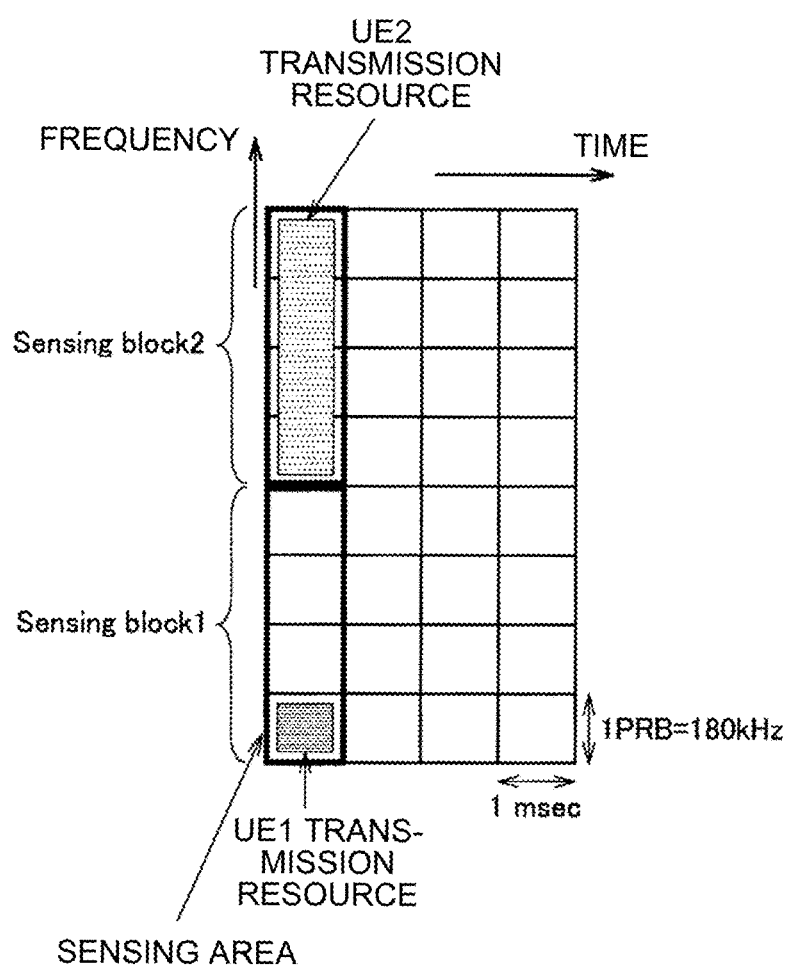
FIG. 22 is an explanatory diagram illustrating an example of sensing of a resource pool in which different numerologies coexist.

FIG. 22 is an explanatory diagram illustrating an example of sensing of a resource pool in which different numerologies coexist. As illustrated in FIG. 22, there is an assumable example in which different subcarrier spacings such as 15 kHz and 60 kHz coexist in one resource pool, for example. For example, it is assumed that there are two terminal devices UE1 and UE2 that transmit using the resources in this resource pool and have mutually different numerologies. In the numerology of UE1, the subcarrier spacing is 15 kHz. When UE1 performs transmission, the minimum unit of transmission resource is 1 millisecond×180 kHz. In contrast, in the numerology of UE2, the subcarrier spacing is 60 kHz. When UE2 performs transmission, the minimum unit of transmission resource is 1 millisecond×720 kHz.

For example, UE2, which requires 720 kHz (corresponding to LTE 4PRB) resources for transmission, performs sensing in units of 1 millisecond×720 kHz. Here, it is assumed that UE1 is close to the terminal device on the transmitting side, and thus the received power for each of resource blocks is large, while UE2 is far from the terminal device on the transmitting side, so thus the received power for each of resource blocks is small. However, since UE1 uses only 180 kHz (corresponding to LTE 1PRB) resources, the received power of sensing block 1 would be smaller than the received power of sensing block 2 in some cases.

Even when the LTE V2X sensing mechanism largely interferes with the resources used by UE1, it is possible that the terminal device on the transmission side will judge that the resources in sensing block 1 have weak interference, and might select a resource in which effects of the interference is extremely high.

In view of this possibility, the terminal device changes the sensing region and performs sensing. Specifically, the terminal device performs sensing for each of resource blocks in a minimum transmittable unit. When performing sensing, the terminal device grasps the size (MinSensingBlockSize) of the minimum unit of transmission resource block used in a sensing window.

Accordingly, the base station may transmit the minimum unit transmission resource block size (MinSensingBlockSize) to the terminal device. The base station may regularly notify the terminal device in the cell of the size information of the transmission resource block in the minimum unit, may notify the terminal device when the terminal device connects to the base station, or may notify the terminal device in response to the request made by the terminal device. The base station may perform notification of the information of the size of the transmission resource block in the minimum unit by using one of a Physical Broadcast Channel (PBCH), Radio Resource Control (RRC), a System Information Block (SIB), PDCCH, or PDSCH.

Since the base station has no knowledge of the MinSensingBlockSize of the Mode 4 terminal device in the cell, the Mode 4 terminal device reports its own MinSensingBlockSize to the base station. After selecting a resource for the first transmission when a Mode 4 terminal device performs transmission by a periodic traffic model, the terminal device reports MinSensingBlockSize to the base station via a Physical Uplink Control Channel (PUCCH) or PUSCH. By contrast, in a case where the Mode 4 terminal device performs transmission by the aperiodic traffic model, the numerology for transmission might be different for each of transmissions. In this case, the Mode 4 terminal device may report the MinSensingBlockSize to the base station each time it selects a resource, or may report, after selecting the resource, a PRB smaller than the previously reported MinSensingBlockSize to the base station only when the smaller MinSensingBlockSize has been used.

The terminal devices may grasp the MinSensingBlockSize of other terminal devices by sharing the MinSensingBlockSize information of their own device with each other. It is allowable to notify the other surrounding terminals of MinSensingBlockSize when a Mode 4 terminal device has selected a resource, or when a Mode 3 terminal device has received resource scheduling from the base station. In addition, the terminal device may include the MinSensingBlockSize information in the SA or data at transmission. When performing notification of the MinSensingBlockSize information of the own device, the terminal device may perform notification using PSCCH or PSSCH, or may share the information using PSDCH when performing Sidelink discovery.

The base station may pre-configure the MinSensingBlockSize information onto the terminal device. That is, the base station may perform preliminary setting of the available MinSensingBlockSize onto the terminal device.

Figure 23:
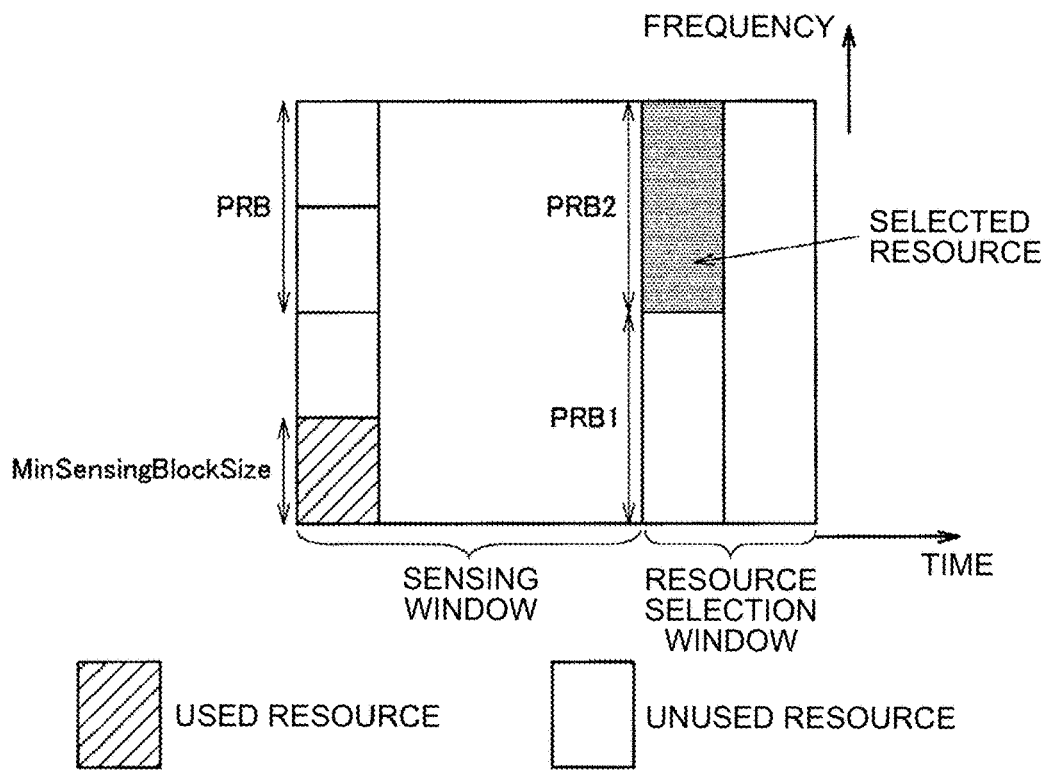
FIG. 23 is an explanatory diagram illustrating an example in which a terminal device selects a resource in units of PRB.

A resource selection method for performing fine sensing in this manner will be described. FIG. 23 is an explanatory diagram illustrating an example in which a terminal device selects a resource in units of PRB. In the example of FIG. 23, two MinSensingBlockSizes correspond to one PRB. In the example of FIG. 23, it is known as a result of sensing that some resources in PRB1 are being used, and thus, PRB2 is selected.

Figure 24:
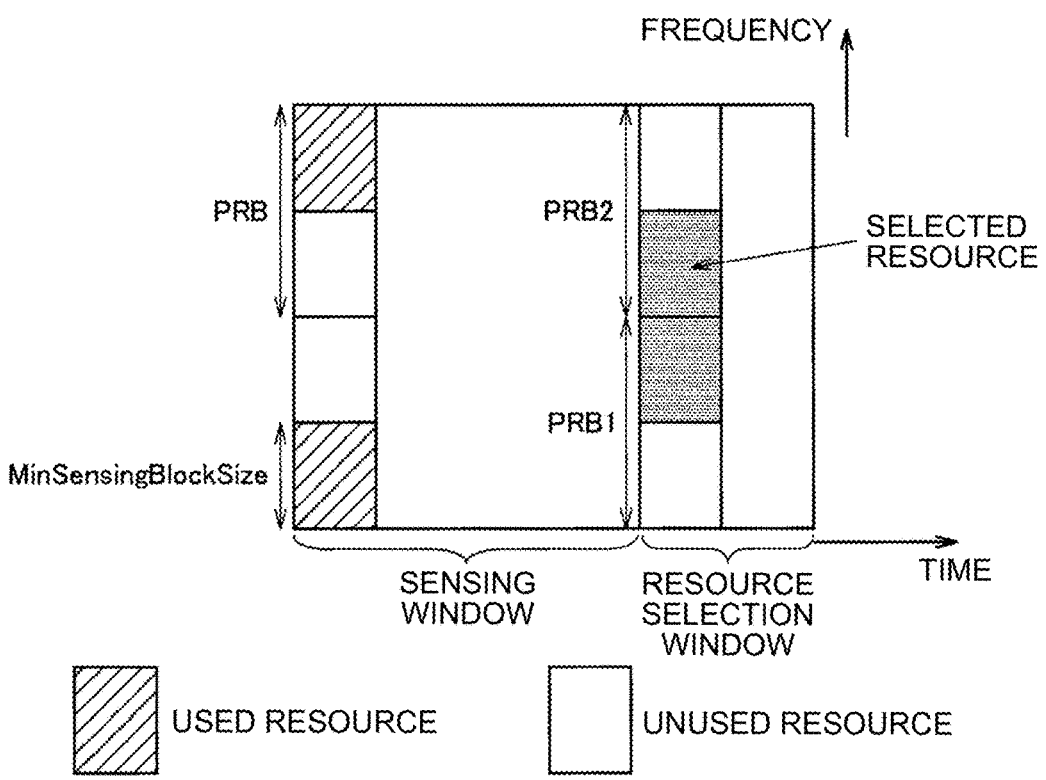
FIG. 24 is an explanatory diagram illustrating an example in which a terminal device selects a resource in units of transmission resource block size, which is the minimum unit.

FIG. 24 is an explanatory diagram illustrating an example in which a terminal device selects a resource in units of transmission resource block size, which is the minimum unit. In the example of FIG. 24, two MinSensingBlockSizes correspond to one PRB. In the example of FIG. 24, it is known as a result of sensing that some resources in PRB1 and some resources in RPB2 are used, and thus, unused resources in PRB1 and PRB2 are selected.

Figure 25A:
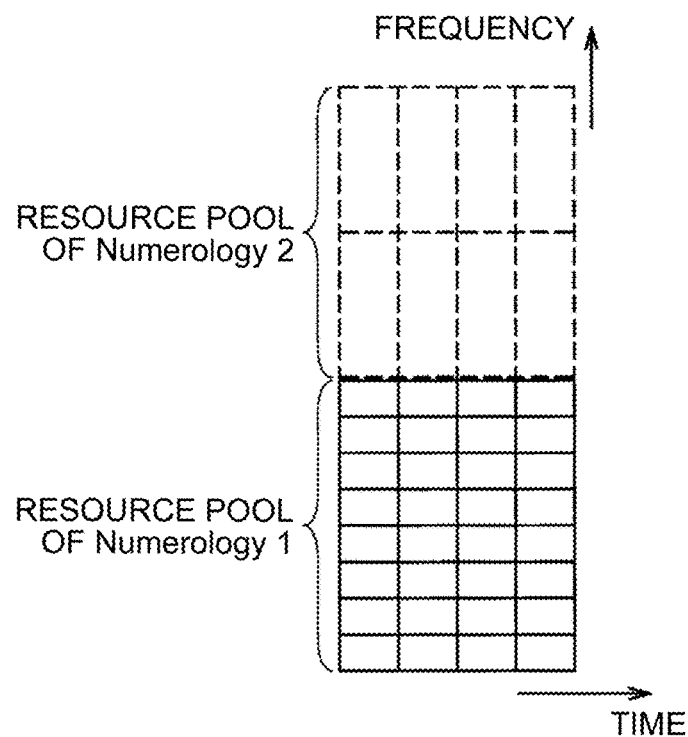
FIG. 25A is an explanatory diagram illustrating a configuration example of a resource pool when different numerologies coexist.
Figure 25B:
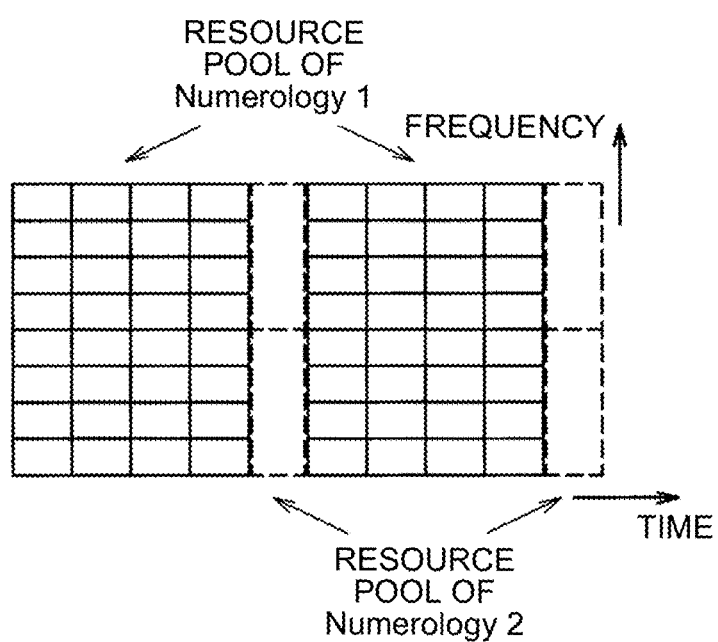
FIG. 25B is an explanatory diagram illustrating a configuration example of a resource pool when different numerologies coexist.

The base station may set orthogonal resource pools for different numerologies and may notify the terminal devices in the cell of the resource pool settings. Pre-configuration of resource pools to the terminal device may be performed for the terminal devices out of coverage. Different numerologies may be configured to be orthogonal in FDM, orthogonal in TDM, or orthogonal in both FDM and TDM. FIGS. 25A to 25C are explanatory diagrams illustrating an example of resource pool configuration when different numerologies coexist. FIG. 25A is an example of a resource pool where different numerologies are orthogonal in FDM. FIG. 25B is an example of a resource pool where different numerologies are orthogonal in TDM. FIG. 25C is an example of a resource pool where different numerologies are orthogonal in both FDM and TDM.

In the slot format of NR Uu link, one subframe can be used for both transmission and reception simultaneously. When the NR slot format is applied to the NR sidelinks, the LTE V2X sensing mechanism might not be usable in some cases.

The NR Uu link supports a slot format including "DL", "UL", and "unknown". The NR sidelink is expected to support a slot format configured in the "SL". On the other hand, since NR meets requirements stricter than LTE, it is possible to perform symbol-by-symbol transmission and reception using the slot format of NR Uu link in a sidelink of NR. The symbol used for SL transmission and reception may be: the UL symbol (U symbol) alone; the "Unknown" symbol (X symbol) alone; both the U symbol and the X symbol; or any symbol ("UL", "DL", or "Unknown").

FIG. 26 is an explanatory diagram illustrating an example of the NR slot format of the NR sidelink. In sensing in LTE V2X, sensing is performed in units of subframe at all times. As illustrated in FIG. 26, when only some symbols are being used for transmission in the sidelink of NR, it would be possible, as a measurement result in units of subframe, that the terminal device might judge that the power level is lower than a threshold, which might affect resource selection.

In view of this possibility, the terminal device performs sensing at a symbol level. In order to support sensing at the symbol level, the base station notifies the terminal device of the slot format. The content notified by the base station is content of the symbol for sidelink transmission within one subframe. This content may be notified in the form of a bitmap, or may be notified in the form of the positions of a start symbol and an end symbol for sidelink transmission. The base station notifies the terminal device of the slot format by SIB, RRC, PBCH, PDCCH, PDSCH, or the like. The base station may notify of the slot format periodically, may notify at the timing when the terminal device connects to the cell, or may notify at the timing when the terminal device requests the slot format information.

Furthermore, the terminal devices may share the slot format of their own devices with each other. It is allowable to notify the other surrounding terminals of the slot format when a Mode 4 terminal device has selected a resource, or when a Mode 3 terminal has received resource scheduling from the base station. Furthermore, the terminal device may include slot format information in the SA or data at the time of transmission. When performing notification of the slot format information of the own device, the terminal device may perform notification using PSCCH or PSSCH, or may share the information using PSDCH when performing Sidelink discovery.

FIG. 27 is an explanatory diagram illustrating sensing at the symbol level. In the figure illustrated in FIG. 27, T represents sidelink transmission and R represents sidelink reception. For example, when transmission symbols continue as illustrated in the upper figure of FIG. 27, the base station notifies the terminal device that perform sensing, of the start symbol "0" and the end symbol "9" for sidelink transmission for another terminal device. Alternatively, the terminal device shares information of the start symbol "0" and the end symbol "9" for sidelink transmission for the own device, with other terminal devices.

The base station may also notify of the resource for sidelink transmission in the form of a bitmap. Alternatively, the terminal device shares the symbol information for sidelink transmission for its own device, with other terminal devices in the form of a bitmap. In the example of FIG. 27, the base station notifies of, or the terminal device shares the information [1111111110000] in the case of the upper figure and [10111011111000] in the case of the lower figure.

Figure 28:
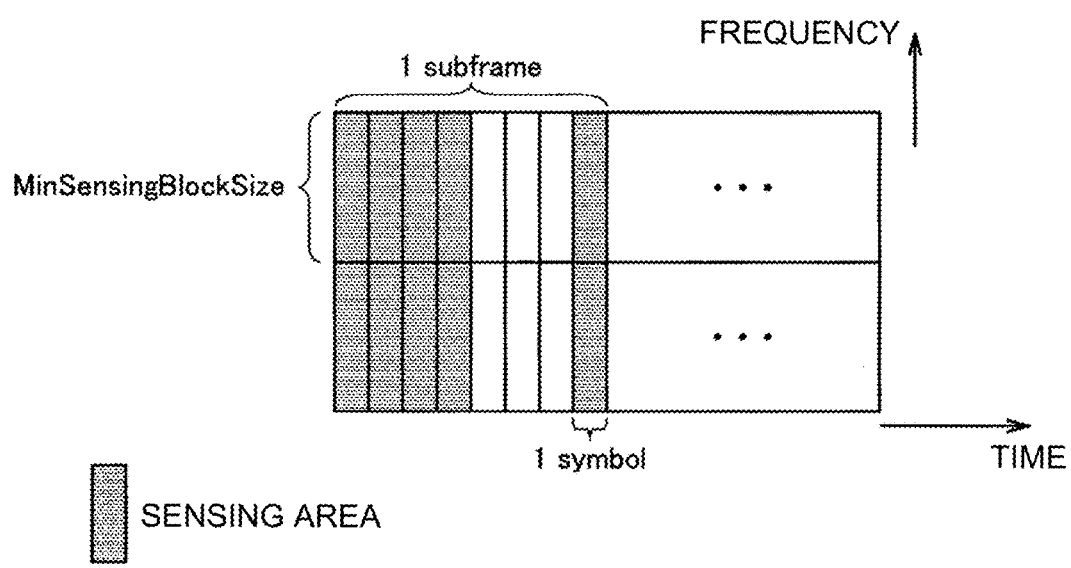
FIG. 28 is an explanatory diagram illustrating an example of hybrid sensing according to the present embodiment.

When the NR slot format is used for sidelinks, it is possible to further have coexistence of a plurality of Numerologies. Therefore, a hybrid sensing method would be required. That is, the terminal device on the transmitting side performs sensing in a sensing area, in units of MinSensingBlockSize on the frequency axis and perform sensing at the symbol level on the time axis. FIG. 28 is an explanatory diagram illustrating an example of hybrid sensing according to the present embodiment. The terminal device on the transmitting side may perform sensing in units of MinSensingBlockSize at the first, second, third, fourth, and eighth symbols in the subframe.

8. Coexistence of LTE V2X and NR V2X

Next, measures to be taken when LTE V2X and NR V2X coexist will be described. When a terminal device that supports LTE alone (LTE UE) and a terminal device that supports NR as well as LTE (NR UE) coexist, the LTE UE that performs LTE V2X communication cannot decode the control signal (SA) of NR V2X. Therefore, the LTE UE might choose resources reserved by an NR UE in some cases.

Figure 29:
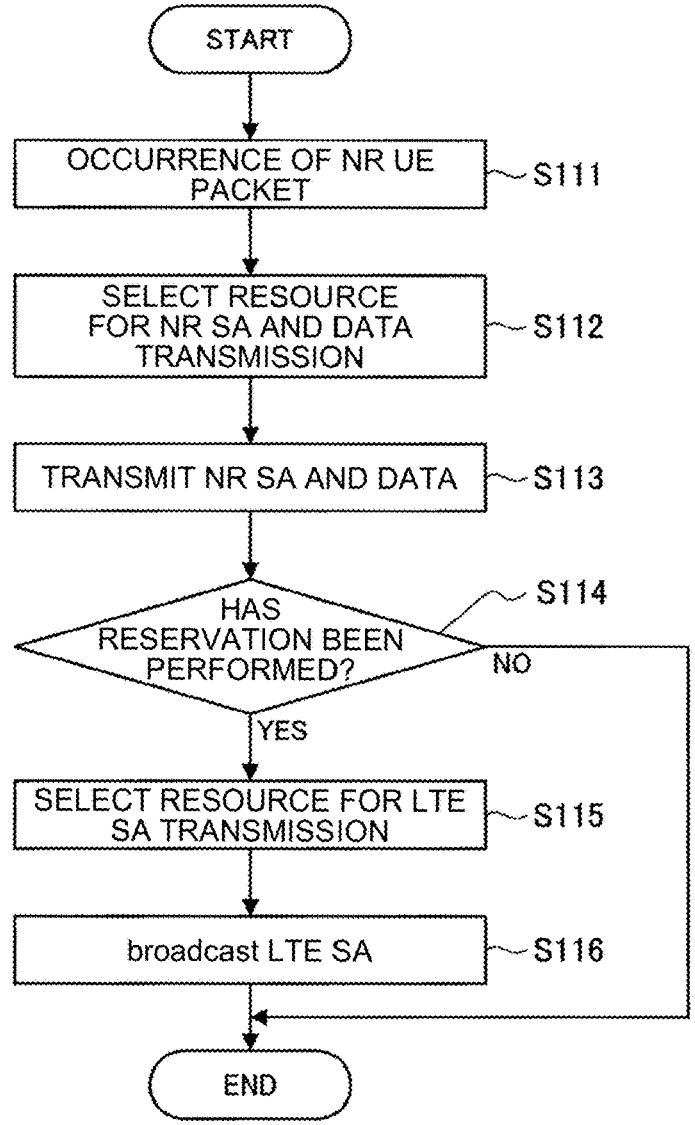
FIG. 29 is a flowchart illustrating an operation example of an NR UE according to the present embodiment.

Therefore, in the present embodiment, the NR UE broadcasts SA by Sidelink Control Information (SCI) of LTE when reserving future resources. FIG. 29 is a flowchart illustrating an operation example of an NR UE according to the present embodiment, specifically illustrating an operation example when an LTE UE and an NR UE coexist. When a packet occurs in an NR UE (Step S111), the NR UE selects the resource for the NR SA and data transmission (Step S112). The NR UE then transmits the SA and data using the selected resource (Step S113).

Figure 30:
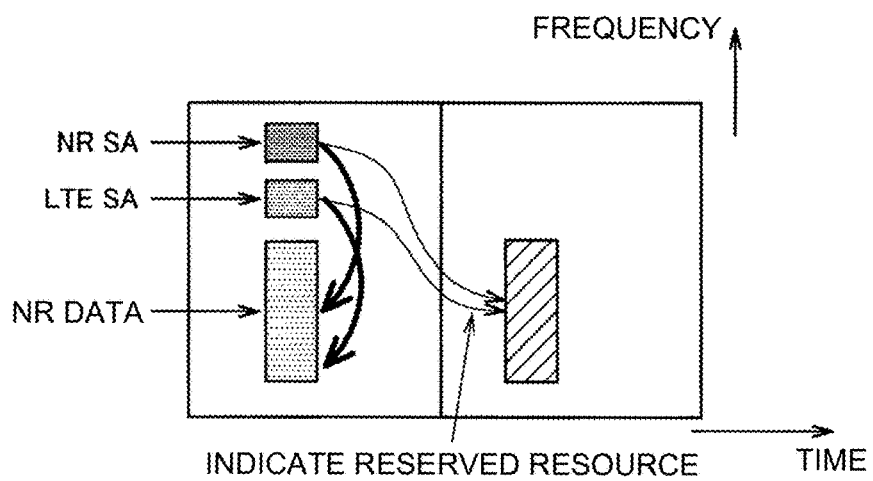
FIG. 30 is an explanatory diagram illustrating an example of indicating related NR data in both NR SA and LTE SA.

The NR UE then judges whether future resource reservation has been made at selection of resources for SA and data transmission (Step S114). In a case where reservation has been made (Step S114, Yes), the NR UE selects the resource for the LTE SA (Step S115) and broadcasts the LTE SA (Step S116). FIG. 30 is an explanatory diagram illustrating an example of indicating related NR data in both NR SA and LTE SA. In a case where no reservation has been made (Steps S114, No), the NR UE skips the processes of Steps S115 and S116.

When broadcasting LTE SA, the NR UE may at least include: the time and frequency resources used for transmission and retransmission of NR data; reservation information (reserved resource information); and an indicator indicating that the transmission data is NR data. The indicator may be an explicit indicator. For example, the NR UE may indicate whether the transmission data is NR data by using a 1-bit indicator. Alternatively, the indicator may be an implicit indicator. For example, the NR UE may indicate whether the transmission data is NR data by using a reserved bit of SCI format 1.

Figure 31:
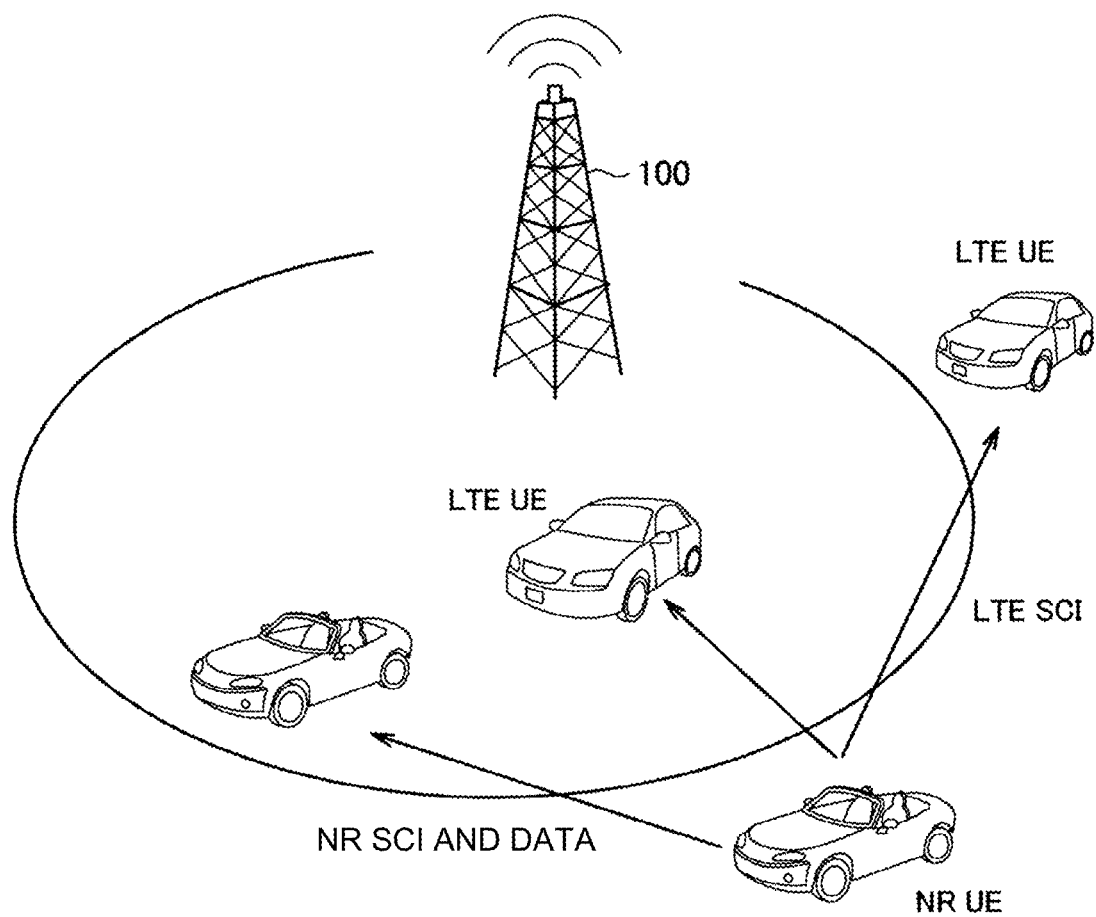
FIG. 31 is an explanatory diagram illustrating a scene in which an NR UE notifies an LTE UE of transmission resources and reservation information for NR data.

FIG. 31 is an explanatory diagram illustrating a scene in which an NR UE notifies an LTE UE of transmission resources and reservation information for NR data. As illustrated in FIG. 31, it is desirable that the NR UE broadcast SA by using LTE SCI to the LTE UE, in a case where the NR UE is at least "Out of Coverage".

Figure 32:
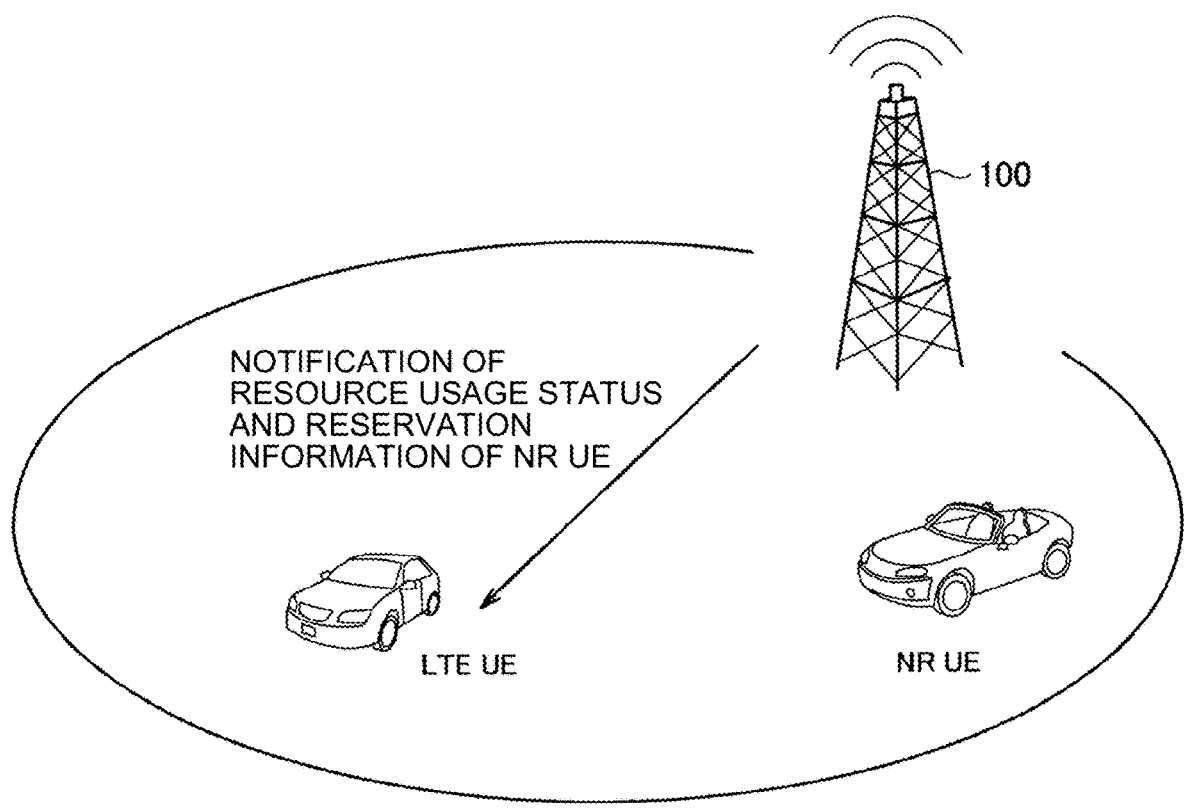
FIG. 32 is an explanatory diagram illustrating a scene in which a base station notifies an LTE UE of a resource usage status and reservation information of a Mode 3 NR UE.

Furthermore, in the present embodiment, the base station may notify the LTE UE that is "In Coverage" that the NR UE being "In Coverage" has reserved future resources. In a case where the NR UE is Mode 3, the base station has allocated the resource to the NR UE. Accordingly, the base station possesses the resource usage status and reservation information. The base station notifies the LTE UE being "In Coverage" of resource usage status and reservation information. FIG. 32 is an explanatory diagram illustrating a scene in which a base station notifies an LTE UE of a resource usage status and reservation information of a Mode 3 NR UE.

The base station notifies the LTE UE of the resource usage status and reservation information using PBCH or PDCCH, for example. The base station may at least include: the time and frequency resources used for transmission and retransmission of NR data; reservation information (reserved resource information); and an indicator indicating that the transmission data is NR data, as resource usage status and reservation information.

Figure 33:
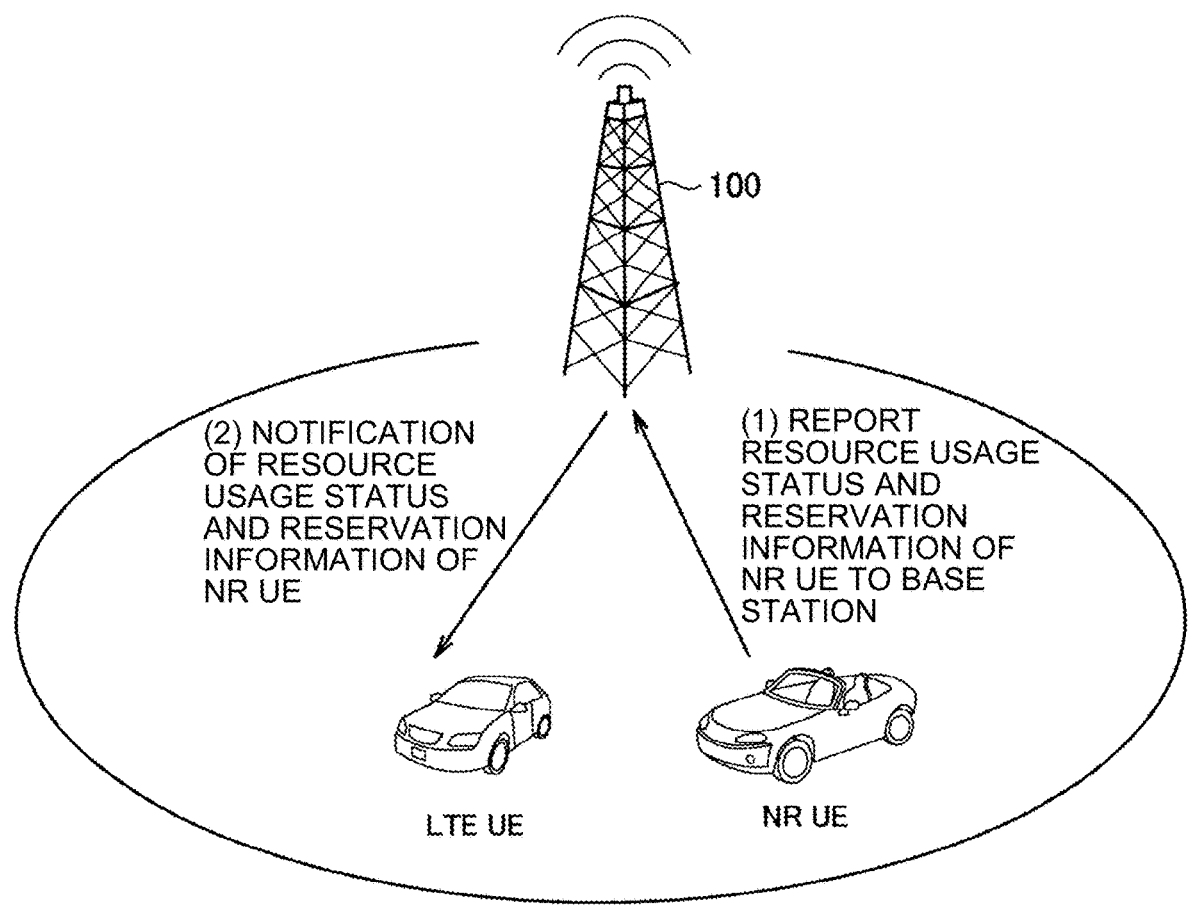
FIG. 33 is an explanatory diagram illustrating an example in which a base station notifies an LTE UE of a resource usage status and reservation information of a Mode 4 NR UE.

In contrast, in a case where the NR UE is Mode 4, the base station cannot grasp the resource usage status of the NR UE. Therefore, in the case where the NR UE is Mode 4, the NR UE reports the resource usage status to the base station. FIG. 33 is an explanatory diagram illustrating an example in which a base station notifies an LTE UE of a resource usage status and reservation information of a Mode 4 NR UE. The Mode 4 NR UE reports the resource usage status and reservation information to the base station using PUCCH, PUSCH, or the like. The Mode 4 NR UE may at least include: the time and frequency resources used for transmission and retransmission of NR data; reservation information (reserved resource information); and an indicator indicating that the transmission data is NR data, as resource usage status and reservation information. In a case of performing reservation of future resources as well as selection of the transmission resource, the Mode 4 NR UE selects the transmission resource and then reports the resource usage status and reservation information to the base station. Having received the report from the NR UE, the base station notifies the LTE UE being "In Coverage" of the information.

Even when the LTE UE is "In Coverage", the base station might not be able to notify the LTE UE of the resource reservation information regarding the NR UE. For example, there is an assumable situation in which the NR UE is at a cell edge, and an LTE UE being "Out of Coverage" exists in the neighbor. Since the base station cannot notify the LTE UE being "Out of Coverage" of the resource reservation information regarding the NR UE, the NR UE needs to notify the LTE UE of its own resource reservation information. Therefore, when there is a possibility that an LTE UE being "Out of Coverage" exists in the neighborhood, the NR UE will broadcast resource reservation information.

Figure 34:
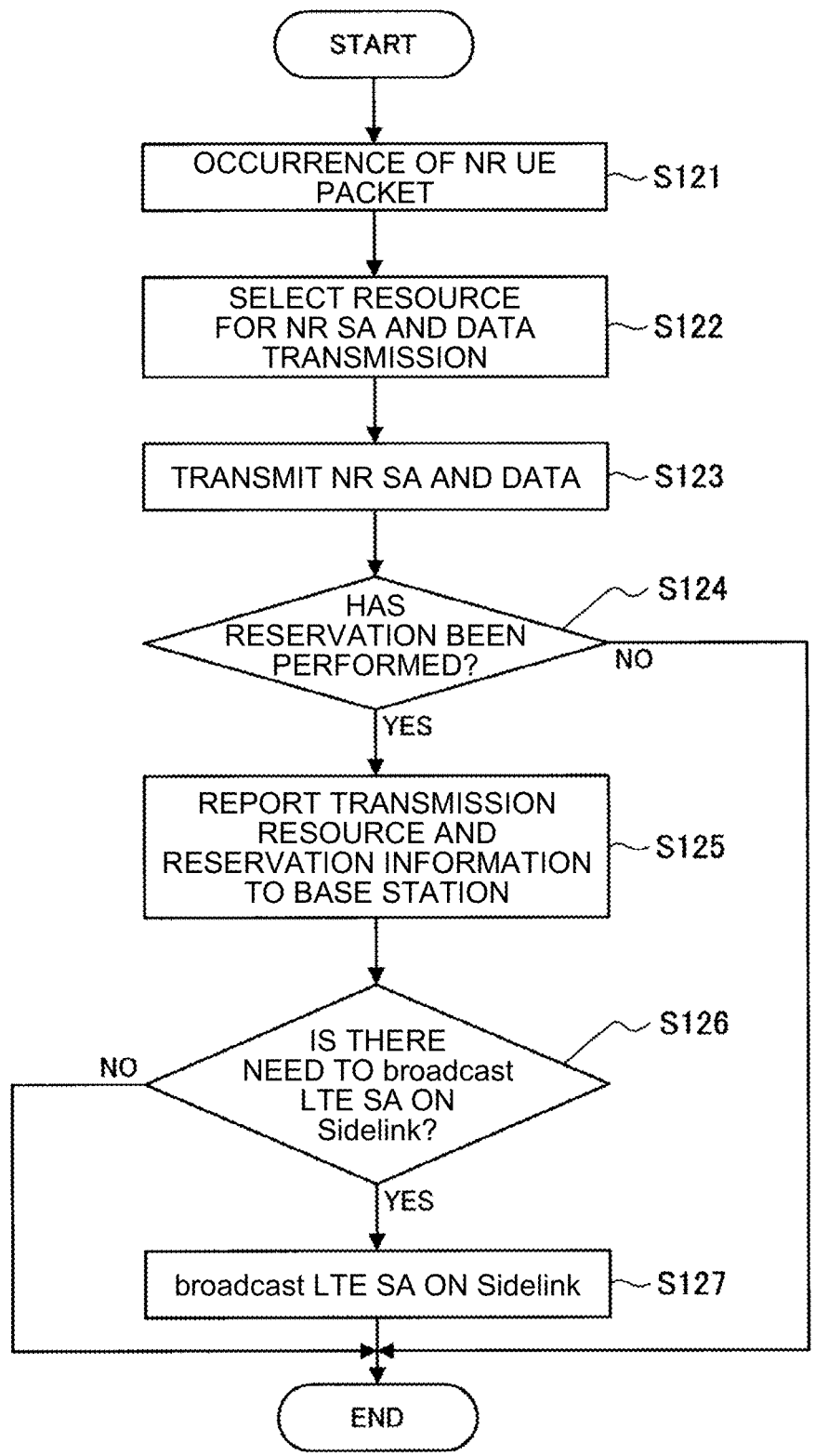
FIG. 34 is a flowchart illustrating an operation example of an NR UE according to the present embodiment.

FIG. 34 is a flowchart illustrating an operation example of an NR UE according to the present embodiment, specifically illustrating an operation example when an LTE UE and an NR UE coexist. FIG. 34 illustrates an example of operation of the NR UE being "In Coverage".

When a packet occurs in an NR UE (Step S121), the NR UE selects the resource for the NR SA and data transmission (Step S122). The NR UE then transmits the SA and data using the selected resource (Step S123).

The NR UE then judges whether future resource reservation has been made at selection of resources for SA and data transmission (Step S124). In a case where future resource reservation has been made (Step S124, Yes), the NR UE reports the transmission resource and the reservation information to the base station (Step S125).

The NR UE then judges whether the LTE SA needs to be broadcast on the sidelink (Step S126). The criterion for this judgment is, for example, when the NR UE is judged to be located at a cell edge. The NR UE may judge whether the NR UE is located at the cell edge based on the received power from the base station, for example. Another criterion would be, for example, when it is judged that the NR UE is located at the cell edge and can perform transmission to the LTE UE being "Out of Coverage". For example, the NR UE makes judgment based on its own transmission power (whether the NR UE has the capacity to transmit) and a traffic model (whether the NR UE can afford to perform transmission). When there is a need to broadcast LTE SA by the sidelink (Step S126, Yes), the NR UE selects the resource for the LTE SA and broadcasts the LTE SA (Step S127).

In a case where no future resource reservation has been made (Steps S124, No), the NR UE skips the processes of Steps S125 to S127. When there is no need to broadcast the LTE SA (Step S126, No), the NR UE skips the process of Step S127.

With these operations, the NR UE can notify the LTE UE of the resource reservation information of its own, and the LTE UE can select the resource so as not to interfere with the NR UE.

9. Application Examples 9.1. Application Examples Related to Base Station

First Application Example

Figure 35:
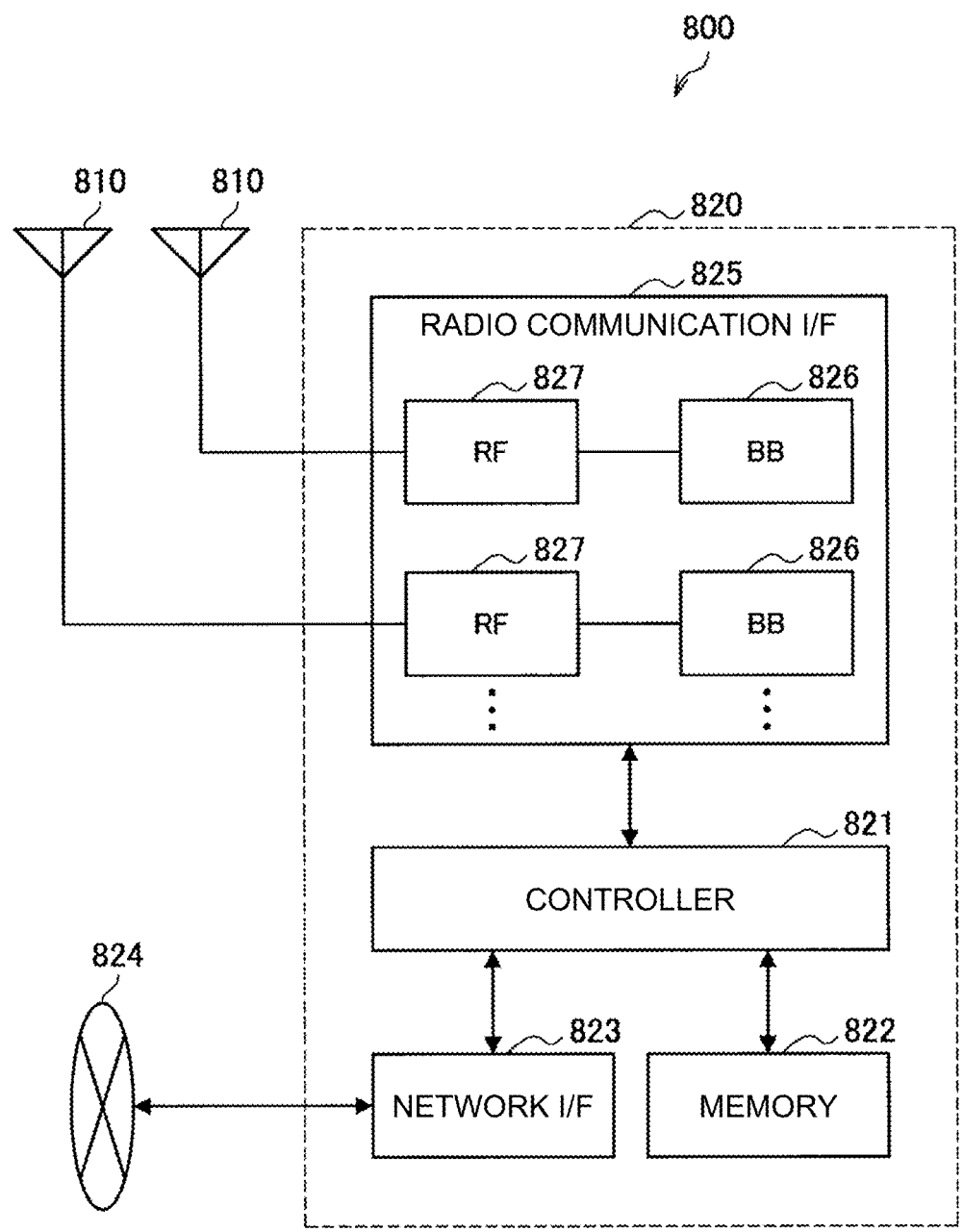
FIG. 35 is a block diagram illustrating a first example of a schematic configuration of an eNB.

FIG. 35 is a block diagram illustrating a first example of a schematic configuration of an eNB to which the techniques according to the present disclosure is applicable. An eNB 800 has one or more antennas 810 and a base station device 820. Each of the antennas 810 and the base station device 820 may be connected to each other via an RF cable.

Each of the antennas 810 has a single or a plurality of antenna elements (for example, a plurality of antenna elements constituting a MIMO antenna) and is used for transmission and reception of radio signals by the base station device 820. The eNB 800 has a plurality of antennas 810 as illustrated in FIG. 35, and the plurality of antennas 810 may correspond to a plurality of frequency bands used by the eNB 800, respectively, for example. Although FIG. 35 illustrates an example in which the eNB 800 has the plurality of antennas 810, the eNB 800 may have a single antenna 810.

The base station device 820 includes a controller 821, memory 822, a network interface 823, and a radio communication interface 825.

The controller 821 may be a CPU or DSP, for example, and controls operation of various functions of an upper layer of the base station device 820. For example, the controller 821 generates a data packet from the data in the signal processed by the radio communication interface 825 and transfers the generated packet via the network interface 823. The controller 821 may generate a bundled packet by bundling data from a plurality of baseband processors and transfer the generated bundled packet. In addition, the controller 821 may include logical functions that execute controls such as radio resource control, radio bearer control, mobility management, admission control, or scheduling. Furthermore, the control may be executed in cooperation with surrounding eNBs or a core network nodes. The memory 822 includes RAM and ROM, and stores a program executed by the controller 821 and various types of control data (for example, terminal list, transmission power data, and scheduling data)

The network interface 823 is a communication interface for connecting the base station device 820 to a core network 824. The controller 821 may communicate with a core network node or other eNBs via the network interface 823. In that case, the eNB 800 may be connected to the core network node or other eNB to each other by a logical interface (for example, an S1 interface or an X2 interface). The network interface 823 may be a wired communication interface or a radio communication interface for a radio backhaul. When the network interface 823 is a radio communication interface, the network interface 823 may use a frequency band higher than the frequency band used by the radio communication interface 825, for radio communication.

The radio communication interface 825 supports a cellular communication scheme such as Long Term Evolution (LTE) or LTE-Advanced, and provides a radio connection to terminals located in the cell of the eNB 800 via the antenna 810. The radio communication interface 825 can typically include a baseband (BB) processor 826, RF circuit 827, or the like. The BB processor 826 may perform, for example, coding/decoding, modulation/demodulation, and multiplexing/demultiplexing, and executes various types of signal processing in individual layers (for example, L1, Medium Access Control (MAC), Radio Link Control (RLC), and Packet Data Convergence Protocol (PDCP)). The BB processor 826 may include some or all of the above-described logical functions instead of the controller 821. The BB processor 826 may be a module including: memory for storing a communication control program; a processor for executing the program; and related circuits. The functions of the BB processor 826 may be modified by updating the above program. Furthermore, the module may be a card or a blade inserted into a slot of the base station device 820, or may be a chip mounted on the card or the blade. The RF circuit 827 may include a mixer, a filter, an amplifier, or the like, and transmits and receives radio signals via the antenna 810.

The radio communication interface 825 may include a plurality of BB processors 826 as illustrated in FIG. 35, and the plurality of BB processors 826 may correspond to a plurality of frequency bands used by the eNB 800, respectively, for example. Furthermore, the radio communication interface 825 may include a plurality of RF circuits 827 as illustrated in FIG. 35, and the plurality of RF circuits 827 may correspond to a plurality of antenna elements, respectively, for example. Although FIG. 35 illustrates an example in which the radio communication interface 825 includes a plurality of BB processors 826 and a plurality of RF circuits 827, the radio communication interface 825 may include a single BB processor 826 or a single RF circuit 827.

In the eNB 800 illustrated in FIG. 35, one or more components included in the base station 100 described with reference to FIG. 2 (for example, at least one of the communication control unit 151, the information acquisition unit 153, and the notification unit 155) may be implemented in the radio communication interface 825. Alternatively, at least some of these components may be implemented in the controller 821. As an example, the eNB 800 is equipped with a module including a part or all of the radio communication interface 825 (for example, the BB processor 826) and/or the controller 821, and the module may be equipped with one or more of the above components. In this case, the module may store a program for causing the processor to function as the one or more components (in other words, a program for causing the processor to perform the operation of the one or more components) and may execute the program. As another example, the program causing the processor to function as the one or more of the above components may be installed in the eNB 800, and the radio communication interface 825 (for example, the BB processor 826) and/or the controller 821 may execute the program. As described above, the eNB 800, the base station device 820, or the above module may be provided as a device including the one or more components, and a program for causing the processor to function as the one or more components may be provided. Furthermore, a readable recording medium on which the above program is recorded may be provided.

Furthermore, in the eNB 800 illustrated in FIG. 35, the radio communication unit 120 described with reference to FIG. 2 may be implemented in the radio communication interface 825 (for example, RF circuit 827). Furthermore, the antenna unit 110 may be implemented in the antenna 810. Furthermore, the network communication unit 130 may be implemented in the controller 821 and/or the network interface 823. Furthermore, the storage unit 140 may be implemented in the memory 822.

Second Application Example

Figure 36:
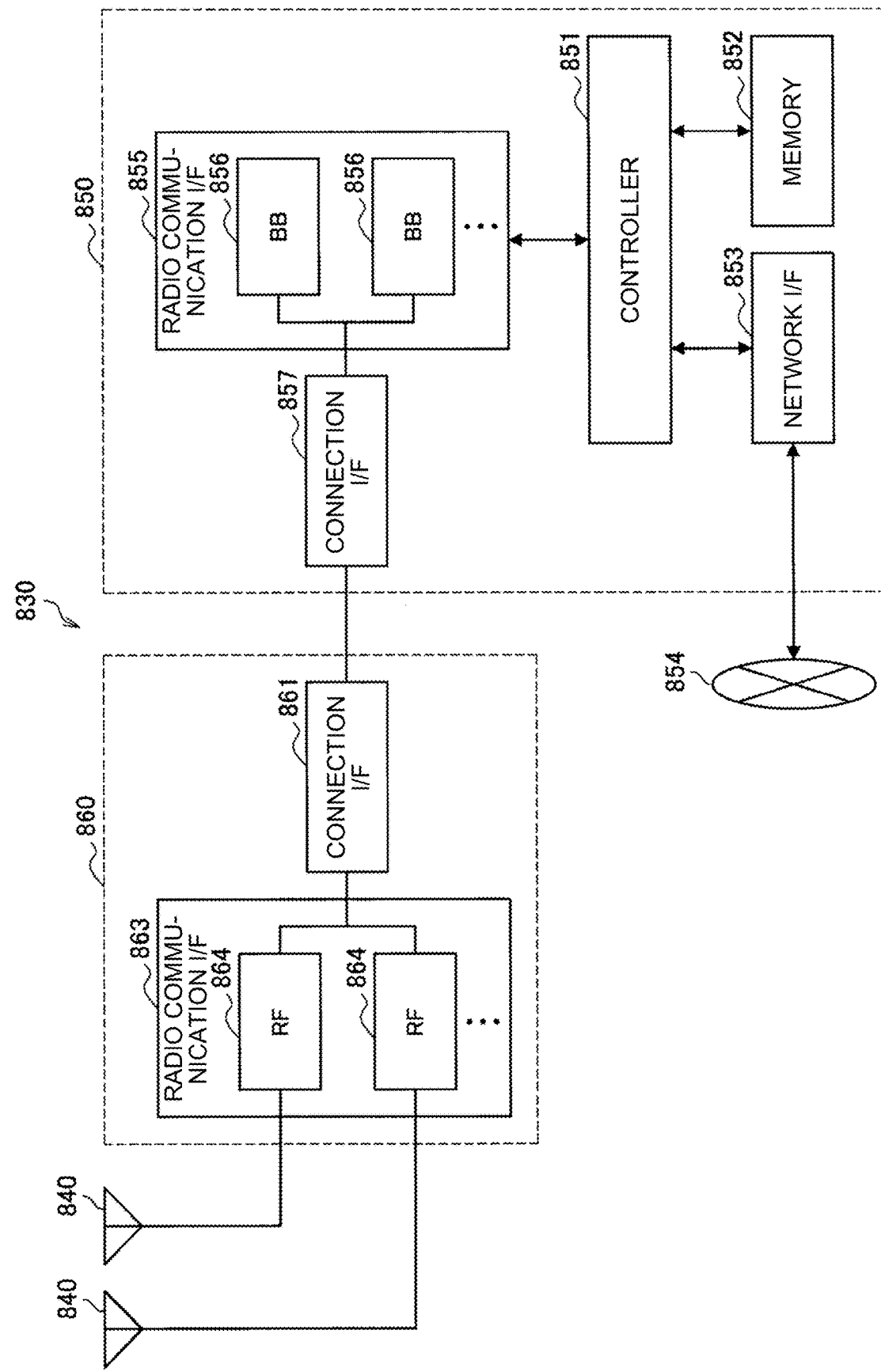
FIG. 36 is a block diagram illustrating a second example of a schematic configuration of an eNB.

FIG. 36 is a block diagram illustrating a second example of a schematic configuration of an eNB to which the techniques according to the present disclosure is applicable. An eNB 830 has one or more antennas 840, a base station device 850, and an RRH 860. Each of the antennas 840 and the RRH 860 can be connected to each other via an RF cable. Furthermore, the base station device 850 and the RRH 860 can be connected to each other by a high-speed line such as an optical fiber cable.

Each of the antennas 840 has a single or a plurality of antenna elements (for example, a plurality of antenna elements constituting a MIMO antenna) and is used for transmission and reception of radio signals by the RRH 860. The eNB 830 has a plurality of antennas 840 as illustrated in FIG. 36, and the plurality of antennas 840 may correspond to a plurality of frequency bands used by the eNB 830, respectively, for example. Although FIG. 36 illustrates an example in which the eNB 830 has a plurality of antennas 840, the eNB 830 may have a single antenna 840.

The base station device 850 includes a controller 851, a memory 852, a network interface 853, a radio communication interface 855, and a connection interface 857. The controller 851, the memory 852, and the network interface 853 are similar to the controller 821, memory 822, and network interface 823 described with reference to FIG. 35, respectively.

The radio communication interface 855 supports a cellular communication scheme such as LTE or LTE-Advanced, and provides a radio connection to terminals located in the sector corresponding to the RRH 860 via the RRH 860 and the antenna 840. The radio communication interface 855 can typically include a BB processor 856 or the like. The BB processor 856 is similar to the BB processor 826 described with reference to FIG. 35, except that connection to an RF circuit 864 of the RRH 860 is made via the connection interface 857. The radio communication interface 855 includes a plurality of BB processors 856 as illustrated in FIG. 36, and the plurality of BB processors 856 may correspond to a plurality of frequency bands used by the eNB 830, respectively, for example. Although FIG. 36 illustrates an example in which the radio communication interface 855 includes a plurality of BB processors 856, the radio communication interface 855 may include a single BB processor 856.

The connection interface 857 is an interface for connecting the base station device 850 (radio communication interface 855) to the RRH 860. The connection interface 857 may be a communication module for communication over the high-speed line connecting the base station device 850 (radio communication interface 855) and the RRH 860.

The RRH 860 also includes a connection interface 861 and a radio communication interface 863.

The connection interface 861 is an interface for connecting the RRH 860 (radio communication interface 863) to the base station device 850. The connection interface 861 may be a communication module for communication over the high-speed line.

The radio communication interface 863 transmits and receives radio signals via the antenna 840. The radio communication interface 863 can typically include the RF circuit 864 or the like. The RF circuit 864 may include a mixer, a filter, an amplifier, or the like, and transmits and receives radio signals via the antenna 840. The radio communication interface 863 includes a plurality of RF circuits 864 as illustrated in FIG. 36, and the plurality of RF circuits 864 may correspond to a plurality of antenna elements, respectively, for example. Although FIG. 36 illustrates an example in which the radio communication interface 863 includes a plurality of RF circuits 864, the radio communication interface 863 may include a single RF circuit 864.

In the eNB 830 illustrated in FIG. 36, one or more components included in the base station 100 described with reference to FIG. 2 (for example, at least one of the communication control unit 151, the information acquisition unit 153, and the notification unit 155) may be implemented in the radio communication interface 855 and/or the radio communication interface 863. Alternatively, at least some of these components may be implemented in the controller 851. As an example, the eNB 830 may be equipped with a module including a part or all of the radio communication interface 855 (for example, the BB processor 856) and/or the controller 851, and the module may be equipped with one or more of the above components. In this case, the module may store a program for causing the processor to function as the one or more components (in other words, a program for causing the processor to perform the operation of the one or more components) and may execute the program. As another example, the program causing the processor to function as the one or more of the above components may be installed in the eNB 830, and the radio communication interface 855 (for example, the BB processor 856) and/or the controller 851 may execute the program. As described above, the eNB 830, the base station device 850, or the above module may be provided as a device including the one or more components, and a program for causing the processor to function as the one or more components may be provided. Furthermore, a readable recording medium on which the above program is recorded may be provided.

Furthermore, in the eNB 830 illustrated in FIG. 36, the radio communication unit 120 described with reference to FIG. 2, for example, may be implemented in the radio communication interface 863 (for example, RF circuit 864). Furthermore, the antenna unit 110 may be implemented in the antenna 840. Furthermore, the network communication unit 130 may be implemented in the controller 851 and/or the network interface 853. Furthermore, the storage unit 140 may be implemented in the memory 852.

9.2. Application Examples Related to Terminal Devices

First Application Example

Figure 37:
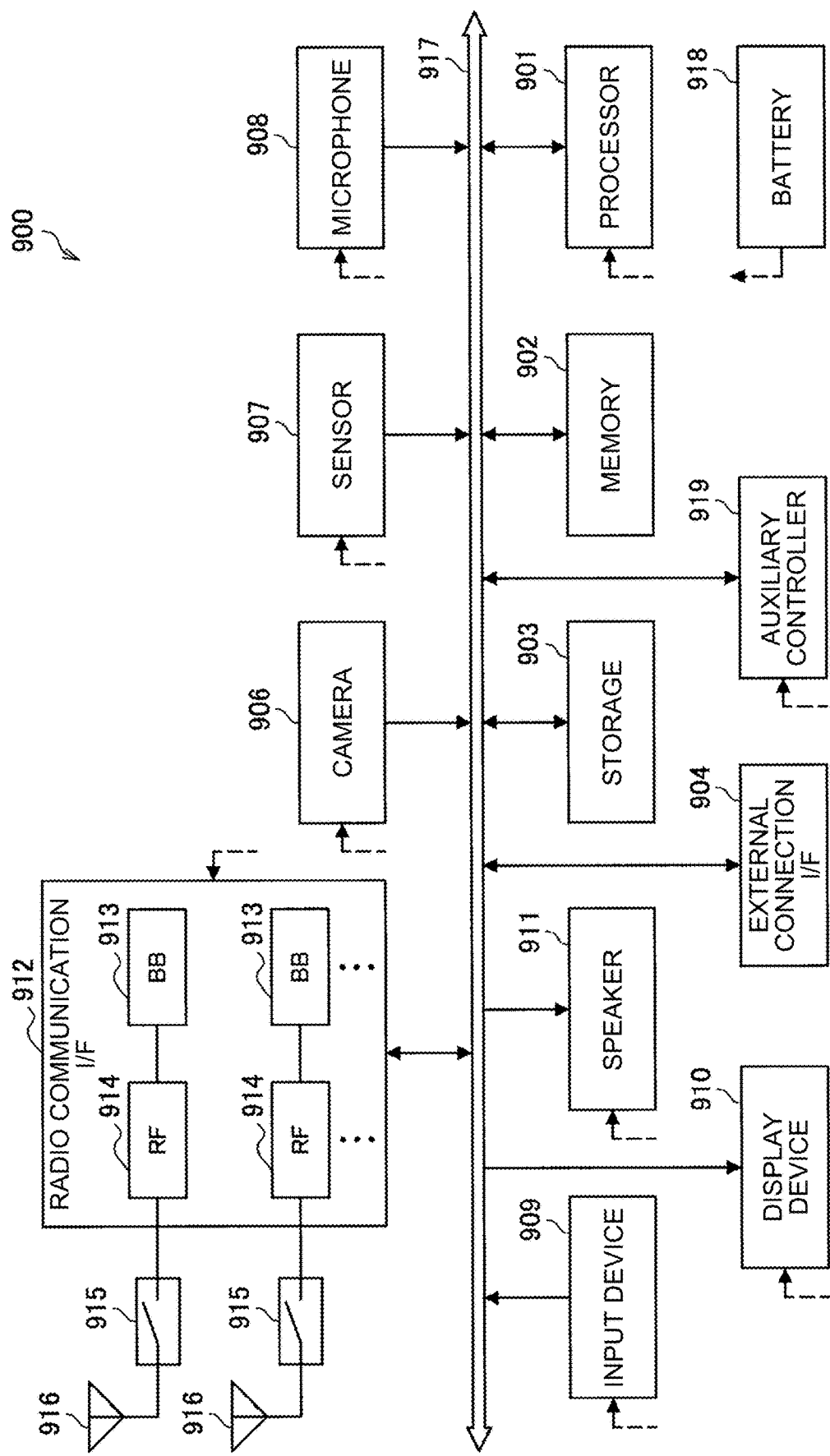
FIG. 37 is a block diagram illustrating an example of a schematic configuration of a smartphone.

FIG. 37 is a block diagram illustrating an example of a schematic configuration of a smartphone 900 to which the technology according to the present disclosure can be applied. The smartphone 900 includes a processor 901, memory 902, storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be a CPU or a System on Chip (SoC), for example, and controls the functions of the application layer and other layers of the smartphone 900. The memory 902 includes RAM and ROM and stores programs to be executed by the processor 901, and data. The storage 903 may include a storage medium such as semiconductor memory or a hard disk. The external connection interface 904 is an interface for connecting an external device such as a memory card or a Universal Serial Bus (USB) device to the smartphone 900.

The camera 906 includes an imaging element such as a Charge Coupled Device (CCD) or a Complementary Metal Oxide Semiconductor (CMOS), and generates a captured image. Examples of the sensor 907 can include a group of sensors such as a positioning sensor, a gyro sensor, a geomagnetic sensor, and an acceleration sensor. The microphone 908 converts the voice input to the smartphone 900 into a voice signal. The input device 909 includes a touch sensor that detects a touch on the screen of the display device 910, a keypad, a keyboard, a button, or a switch and receives an input of operation or information from the user. The display device 910 has a screen such as a liquid crystal display (LCD) or an organic light emitting diode (OLED) display, and displays an output image of the smartphone 900. The speaker 911 converts the voice signal output from the smartphone 900 into voice.

The radio communication interface 912 supports a cellular communication scheme such as LTE or LTE-Advanced and executes radio communication. The radio communication interface 912 can typically include a BB processor 913, an RF circuit 914, or the like. The BB processor 913 may perform, for example, encoding/decoding, modulation/demodulation, and multiplexing/demultiplexing, and performs various signal processing for radio communication. The RF circuit 914 may include a mixer, a filter, an amplifier, or the like, and transmits and receives radio signals via the antenna 916. The radio communication interface 912 may be a one-chip module integrating the BB processor 913 and the RF circuit 914. The radio communication interface 912 may include a plurality of BB processors 913 and a plurality of RF circuits 914 as illustrated in FIG. 37. Although FIG. 37 illustrates an example in which the radio communication interface 912 includes a plurality of BB processors 913 and a plurality of RF circuits 914, the radio communication interface 912 may include a single BB processor 913 or a single RF circuit 914.

Furthermore, the radio communication interface 912 may support other types of radio communication scheme such as short-range radio communication scheme, near field radio communication scheme, or wireless Local Area Network (LAN) scheme in addition to the cellular communication scheme. In that case, the radio communication interface 912 may include the BB processor 913 and the RF circuit 914 for each of the radio communication schemes.

Each of the antenna switches 915 switches the connection destination of the antenna 916 between a plurality of circuits included in the radio communication interface 912 (for example, circuits for different radio communication schemes).

Each of the antennas 916 has a single or a plurality of antenna elements (for example, a plurality of antenna elements constituting a MIMO antenna) and is used for transmitting and receiving radio signals by the radio communication interface 912. The smartphone 900 may have a plurality of antennas 916 as illustrated in FIG. 37. Although FIG. 37 illustrates an example in which the smartphone 900 has the plurality of antennas 916, the smartphone 900 may have a single antenna 916.

Furthermore, the smartphone 900 may be provided with an antenna 916 for each of the radio communication schemes. In that case, the antenna switch 915 may be omitted from the configuration of the smartphone 900.

Bus 917 provides mutual connection between the processor 901, the memory 902, the storage 903, the external connection interface 904, the camera 906, the sensor 907, the microphone 908, the input device 909, the display device 910, the speaker 911, the radio communication interface 912, and the auxiliary controller 919. The battery 918 supplies power to individual blocks of the smartphone 900 illustrated in FIG. 37 via the power supply lines partially illustrated by the broken lines in the figure. The auxiliary controller 919 controls operation of minimum necessary functions of the smartphone 900 during a sleep mode, for example.

In the smartphone 900 illustrated in FIG. 37, one or more components (for example, at least one of communication control unit 241, information acquisition unit 243, and notification unit 247) included in the terminal device 200 described with reference to FIG. 3 may be implemented in the radio communication interface 912. Alternatively, at least some of these components may be implemented in the processor 901 or the auxiliary controller 919. As an example, the smartphone 900 may be equipped with a module including a part (for example, BB processor 913) or all of the radio communication interface 912, the processor 901, and/or the auxiliary controller 919, and may be equipped with one or more of the above-described components in the module. In this case, the module may store a program for causing the processor to function as the one or more components (in other words, a program for causing the processor to perform the operation of the one or more components) and may execute the program. As another example, the program causing the processor to function as the one or more of the above components may be installed in the smartphone 900, and the radio communication interface 912 (for example, the BB processor 913), the processor 901, and/or the auxiliary controller 919 may execute the program. As described above, the smartphone 900 or the above module may be provided as a device including the one or more components, and a program for causing the processor to function as the one or more components may be provided. Furthermore, a readable recording medium on which the above program is recorded may be provided.

Furthermore, in the smartphone 900 illustrated in FIG. 37, for example, the radio communication unit 220 described with reference to FIG. 3 may be implemented in the radio communication interface 912 (for example, RF circuit 914). Furthermore, the antenna unit 210 may be implemented in the antenna 916. Furthermore, the storage unit 230 may be implemented in the memory 902.

Second Application Example

Figure 38:
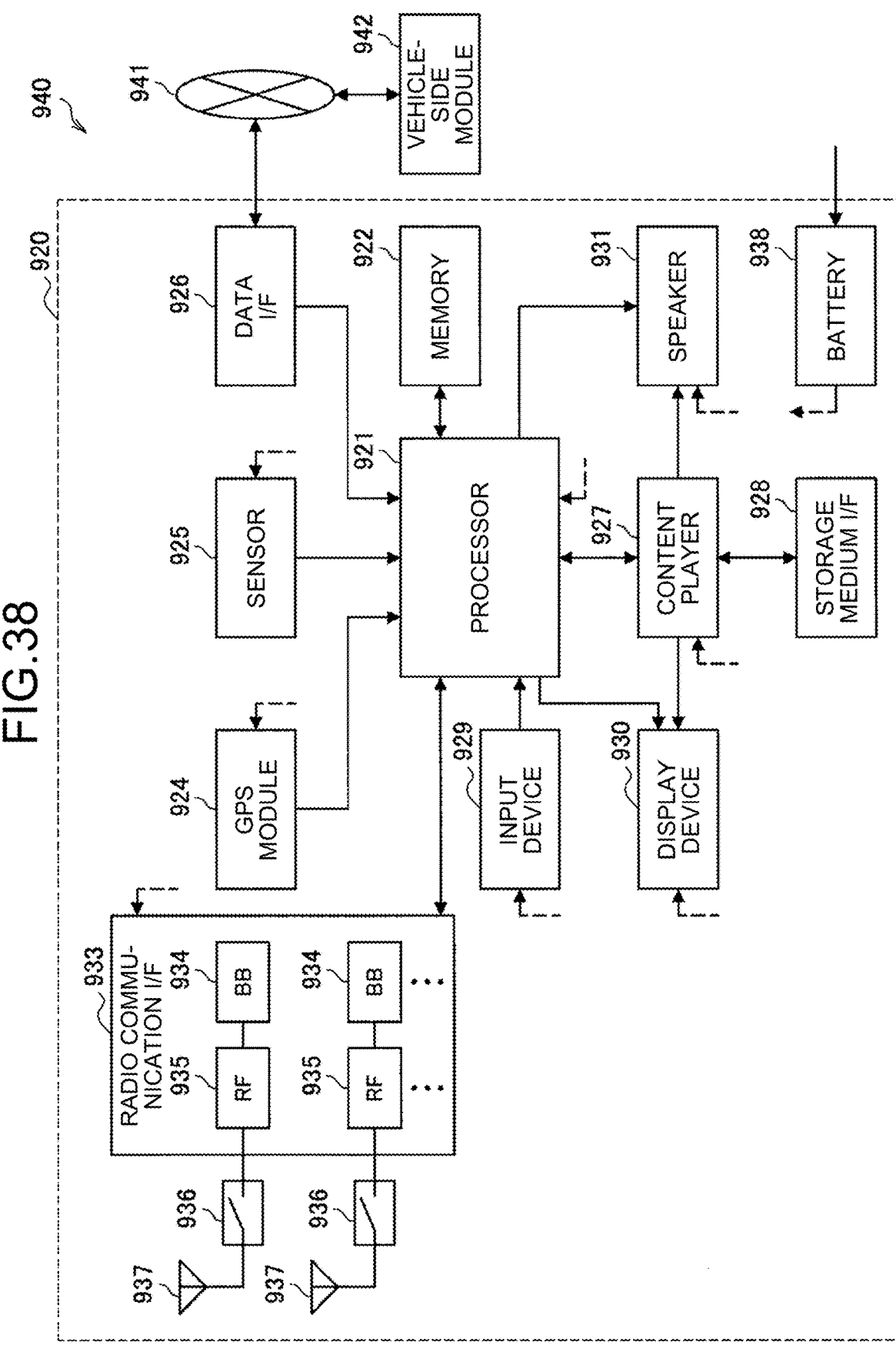
FIG. 38 is a block diagram illustrating an example of a schematic configuration of a car navigator.

FIG. 38 is a block diagram illustrating an example of a schematic configuration of a car navigator 920 to which the technique according to the present disclosure is applicable. The car navigator 920 includes a processor 921, memory 922, a Global Positioning System (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be a CPU or SoC, for example, and controls the navigation function and other functions of the car navigator 920. The memory 922 includes RAM and ROM and stores programs to be executed by the processor 921, and data.

The GPS module 924 measures the position (including latitude, longitude, and altitude) of the car navigator 920 using GPS signals received from GPS satellites. The sensor 925 can include a group of sensors such as a gyro sensor, a geomagnetic sensor, and a barometric pressure sensor, for example. The data interface 926 is connected to an in-vehicle network 941 via a terminal (not illustrated), for example, and acquires data generated on the vehicle side such as vehicle speed data.

The content player 927 plays pieces of content stored on a storage medium (for example, a CD or DVD) inserted into the storage medium interface 928. The input device 929 includes a touch sensor that detects a touch on the screen of the display device 930, a button, or a switch and receives an input of operation or information from the user. The display device 930 includes a screen such as an LCD or OLED display and displays an image of a navigation function or a content to be played. The speaker 931 outputs the sound of the navigation function or the content to be played.

The radio communication interface 933 supports a cellular communication scheme such as LTE or LTE-Advanced and executes radio communication. The radio communication interface 933 can typically include a BB processor 934, an RF circuit 935, or the like. The BB processor 934 may perform, for example, encoding/decoding, modulation/demodulation, and multiplexing/demultiplexing, and performs various signal processing for radio communication. The RF circuit 935 may include a mixer, a filter, an amplifier, or the like, and transmits and receives radio signals via the antenna 937. The radio communication interface 933 may be a one-chip module integrating the BB processor 934 and the RF circuit 935. The radio communication interface 933 may include a plurality of BB processors 934 and a plurality of RF circuits 935 as illustrated in FIG. 38. Although FIG. 38 illustrates an example in which the radio communication interface 933 includes a plurality of BB processors 934 and a plurality of RF circuits 935, the radio communication interface 933 may include a single BB processor 934 or a single RF circuit 935.

Furthermore, the radio communication interface 933 may support other types of radio communication schemes such as short-range radio communication scheme, near field radio communication scheme, or a wireless LAN scheme in addition to the cellular communication scheme. In that case, the radio communication interface 933 may include the BB processor 934 and the RF circuit 935 for each of the radio communication schemes.

Each of the antenna switches 936 switches the connection destination of the antenna 937 between a plurality of circuits included in the radio communication interface 933 (for example, circuits for different radio communication schemes).

Each of the antennas 937 has a single or a plurality of antenna elements (for example, a plurality of antenna elements constituting a MIMO antenna) and is used for transmitting and receiving radio signals by the radio communication interface 933. The car navigator 920 may have a plurality of antennas 937 as illustrated in FIG. 38. Although FIG. 38 illustrates an example in which the car navigator 920 has a plurality of antennas 937, the car navigator 920 may have a single antenna 937.

Furthermore, the car navigator 920 may include the antenna 937 for each of the radio communication schemes. In that case, the antenna switch 936 may be omitted from the configuration of the car navigator 920.

The battery 938 supplies power to individual blocks of the car navigator 920 illustrated in FIG. 38 via the power supply lines partially illustrated by the broken lines in the figure. In addition, the battery 938 stores electric power supplied from the vehicle side.

In the car navigator 920 illustrated in FIG. 38, one or more components (for example, at least one of the communication control unit 241, the information acquisition unit 243, and notification unit 247) included in the terminal device 200 described with reference to FIG. 3 may be implemented in the radio communication interface 933. Alternatively, at least some of these components may be implemented in the processor 921. As an example, the car navigator 920 may be equipped with a module including a part (for example, BB processor 934) or all of the radio communication interface 933 and/or the processor 921, and the module may be equipped with one or more of the above components. In this case, the module may store a program for causing the processor to function as the one or more components (in other words, a program for causing the processor to perform the operation of the one or more components) and may execute the program. As another example, a program causing the processor function as one or more of the above components may be installed in the car navigator 920, and the radio communication interface 933 (for example, the BB processor 934) and/or the processor 921 may execute the program. As described above, the car navigator 920 or the above module may be provided as a device including the one or more components, and a program for causing the processor to function as the one or more components may be provided. Furthermore, a readable recording medium on which the above program is recorded may be provided.

Furthermore, in the car navigator 920 illustrated in FIG. 38, the radio communication unit 220 described with reference to FIG. 3, for example, may be implemented in the radio communication interface 933 (for example, RF circuit 935). Furthermore, the antenna unit 210 may be implemented in the antenna 937. Furthermore, the storage unit 230 may be implemented in the memory 922.

Furthermore, the technique according to the present disclosure may be actualized as an in-vehicle system (or vehicle) 940 including one or more blocks of the car navigator 920 described above, the in-vehicle network 941, and a vehicle-side module 942. The vehicle-side module 942 generates vehicle-side data such as vehicle speed, engine speed, or failure information, and outputs the generated data to the in-vehicle network 941.

10. Summary

As described above, according to the embodiment of the present disclosure, there are provided a terminal device capable of efficiently sensing resources in NR V2X communication, and a base station device that performs radio communication with the terminal device.

Although the embodiment of the present disclosure has been described mainly for V2X communication, the present disclosure is not limited to such an example. Since the technique is an extension of the sidelink, and thus will be naturally applicable also to use cases other than V2X communication. For example, the technique illustrated in the embodiment of the present disclosure is applicable to D2D communication, MTC communication, moving cell, relay communication, or the like. The embodiment of the present disclosure may also be applied to multi-carrier communication in which sidelink communication is performed using a plurality of carriers.

The base station 100 illustrated in FIG. 2 can function as an example of the control apparatus of the present disclosure. Moreover, in the configuration of the base station 100 illustrated in FIG. 2, the radio communication unit 120 can function as a communication unit of the control apparatus of the present disclosure, and the control unit 150 can function as a control unit of the control apparatus of the present disclosure.

The terminal device 200 illustrated in FIG. 3 can function as an example of the communication apparatus of the present disclosure. Moreover, in the configuration of the terminal device 200 illustrated in FIG. 3, the radio communication unit 220 can function as a communication unit of the communication apparatus of the present disclosure, and the control unit 240 can function as a control unit of the communication apparatus of the present disclosure. Furthermore, the terminal device 200 may also be a device provided in a mobile body. The mobile body can be a vehicle.

Individual steps in the process executed by individual devices in the present specification need not necessarily be processed sequentially in the order described as a sequence diagram or a flowchart. For example, individual steps in the process executed by individual devices may be processed in an order different from the order described as the flowchart, or may be processed in parallel.

Furthermore, it is possible to create a computer program for causing hardware such as a CPU, ROM, and RAM incorporated in individual devices to exhibit the same function as the configuration of the individual device described above. A storage medium storing the computer program can also be provided. Furthermore, with a configuration using hardware to form the individual function blocks illustrated in the functional block diagram, it is also possible to actualize the series of processes by hardware.

The preferred embodiments of the present disclosure have been described in detail above with reference to the accompanying drawings. However, the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

The preferred embodiments of the present disclosure have been described in detail above with reference to the accompanying drawings. However, the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

Furthermore, the effects described in the present specification are merely illustrative or exemplary and are not limited. That is, the technique according to the present disclosure can exhibit other effects that are apparent to those skilled in the art from the description of the present specification in addition to or instead of the above effects.

Note that the following configurations also belong to the technical scope of the present disclosure.

(1)

A communication apparatus comprising:

a communication unit that performs radio communication;

a control unit that controls an operation of sensing resources to be used in a communication scheme for inter-device communication with other devices, wherein the control unit controls to sense the resource in a predetermined minimum unit on a time axis.

(2)

The communication apparatus according to (1), wherein the control unit controls to sense the resource in units of symbols.

(3)
The communication apparatus according to (2), wherein the control unit controls so as to sense the resource in units of symbols based on a slot format received by the communication unit.
(4)
The communication apparatus according to (3), wherein the slot format is notified from a base station.
(5)
The communication apparatus according to (4), wherein the slot format is periodically notified from the base station.
(6)
The communication apparatus according to (4), wherein the slot format is notified from the base station at a point where a connection is made to a cell.
(7)
The communication apparatus according to (4), wherein the slot format is notified from the base station in response to a request to the base station.
(8)
The communication apparatus according to (4), wherein the slot format is shared with the other device.
(9)
The communication apparatus according to any one of (1) to (8), wherein the control unit further controls to sense the resource in a predetermined minimum transmittable unit on a frequency axis.
(10)
The communication apparatus according to (9), wherein the control unit controls to perform sensing based on information in the minimum unit.
(11)
The communication apparatus according to (10), wherein the information in the minimum unit is notified from the base station.
(12)
The communication apparatus according to (11), wherein the information in the minimum unit is periodically notified from the base station.
(13)
The communication apparatus according to (11), wherein the information in the minimum unit is notified from the base station at a point where a connection is made to a cell.
(14)
The communication apparatus according to (11), wherein the information in the minimum unit is notified from the base station in response to a request to the base station.
(15)
The communication apparatus according to (11), wherein the information in the minimum unit is shared with the other device.
(16)
The communication apparatus according to any one of (1) to (15), wherein the resources of different numerologies are set orthogonally.
(17)
The communication apparatus according to any one of (1) to (16), wherein the control unit controls to notify of information regarding the resource that has been reserved, from the communication unit.
(18)
The communication apparatus according to (17), wherein the control unit controls to broadcast the information regarding the resource that has been reserved, from the communication unit.
(19)
The communication apparatus according to (17), wherein the control unit controls to notify a base station as a communication partner, of the information regarding the resource that has been reserved.
(20)
The communication apparatus according to any one of (1) to (19), the apparatus being a device provided on a mobile body.
(21)
The communication apparatus according to (20), wherein the mobile body is a vehicle.
(22)
A control apparatus comprising:
a communication unit that performs radio communication with a terminal device;
a control unit that controls to notify of information to control an operation of sensing resources from the communication unit, the sensing resources being used in a communication scheme used for performing inter-device communication between the terminal device and another device,
wherein the control unit controls to notify the terminal device of information needed for controlling to sense the resource in a predetermined minimum unit on a time axis, from the communication unit.
(23)
A communication system comprising at least two sets of the communication apparatuses according to any one of (1) to (21).

REFERENCE SIGNS LIST

1 SYSTEM
100 BASE STATION
110 ANTENNA UNIT
120 RADIO COMMUNICATION UNIT
130 NETWORK COMMUNICATION UNIT
140 STORAGE UNIT
150 CONTROL UNIT
151 COMMUNICATION CONTROL UNIT
153 INFORMATION ACQUISITION UNIT
155 NOTIFICATION UNIT
200 TERMINAL DEVICE
210 ANTENNA UNIT
220 RADIO COMMUNICATION UNIT
230 STORAGE UNIT
240 CONTROL UNIT
241 COMMUNICATION CONTROL UNIT
243 INFORMATION ACQUISITION UNIT
247 NOTIFICATION UNIT

The invention claimed is:

1. A communication apparatus comprising:
a transceiver that performs radio communication;
a control circuitry that:
selects a first and second time-frequency resource, in units of symbols based on a slot format that has been received by the transceiver, to be used in a communication scheme for inter-device communication with a first and second device, respectively, and
performs the inter-device communication with the first and second devices via the selected first and second time-frequency resources,
wherein the first and second time-frequency resources are selected from a plurality of time-frequency resources of a numerology, the numerology being one of a plurality of different numerologies that are set orthogonally, each of the plurality of different numerologies corresponding to different sets of time-frequency resources, wherein the first time-frequency resource is selected from within a sensing window based on a result of a power measurement sensing performed in the sensing window in a minimum unit of a transmission resource block in a frequency axis, and wherein the second time-frequency resource is selected from within a resource selection window based on a time-frequency resource reservation status. the resource selection window following the sensing window.

2. The communication apparatus according to claim 1, wherein the minimum unit of the transmission resource block comprises one or more symbols.

3. The communication apparatus according to claim 2, wherein the minimum unit of the transmission resource block corresponds to a slot format received by the communication apparatus.

4. The communication apparatus according to claim 3, wherein the slot format is received from a base station.

5. The communication apparatus according to claim 4, wherein the slot format is periodically received from the base station.

6. The communication apparatus according to claim 4, wherein the slot format is received from the base station at a point where a connection is made to a cell by the communication apparatus.

7. The communication apparatus according to claim 4, wherein the slot format is received from the base station in response to a request to the base station.

8. The communication apparatus according to claim 4, wherein the slot format is shared with the second device.

9. The communication apparatus according to claim 1, wherein the control circuitry reserves the second time-frequency resource based on predetermined criteria.

10. The communication apparatus according to claim 9, wherein the control circuitry broadcasts information regarding the second time-frequency resource.

11. The communication apparatus according to claim 9, wherein the control circuitry transmits information to a base station indicating that the second time-frequency resource that has been reserved.

12. The communication apparatus according to claim 1, the apparatus being a device provided on a mobile body.

13. The communication apparatus according to claim 12, wherein the mobile body is a vehicle.

14. A method performed by a communication apparatus, the method comprising:
    selecting a first and second time-frequency resource, in units of symbols based on a slot format that has been received by the transceiver, to be used in a communication scheme for inter-device communication with a first and second device, respectively, and
    performing the inter-device communication with the first and second devices via the selected first and second time-frequency resources,
    wherein the first and second time-frequency resources are selected from a plurality of time-frequency resources of a numerology, the numerology being one of a plurality of different numerologies that are set orthogonally, each of the plurality of different numerologies corresponding to different sets of time-frequency resources,
    wherein the first time-frequency resource is selected from within a sensing window based on a result of a power measurement sensing performed in the sensing window in a minimum unit of a transmission resource block in a frequency axis, and
    wherein the second time-frequency resource is selected from within a resource selection window based on a time-frequency resource reservation status, the resource selection window following the sensing window.

15. A non-transitory computer readable medium containing instructions for a method to be performed by a communication apparatus, the method comprising:
    selecting a first and second time-frequency resource, in units of symbols based on a slot format that has been received by the transceiver, to be used in a communication scheme for inter-device communication with a first and second device, respectively, and
    performing the inter-device communication with the first and second devices via the selected first and second time-frequency resources,
    wherein the first and second time-frequency resources are selected from a plurality of time-frequency resources of a numerology, the numerology being one of a plurality of different numerologies that are set orthogonally, each of the plurality of different numerologies corresponding to different sets of time-frequency resources,
    wherein the first time-frequency resource is selected from within a sensing window based on a result of a power measurement sensing performed in the sensing window in a minimum unit of a transmission resource block in a frequency axis, and
    wherein the second time-frequency resource is selected from within a resource selection window based on a time-frequency resource reservation status, the resource selection window following the sensing window.

* * * * *